(12) United States Patent
Sadler et al.

(10) Patent No.: US 11,860,886 B1
(45) Date of Patent: Jan. 2, 2024

(54) SYSTEM AND METHOD FOR CREATING AND SHARING BOTS

(71) Applicant: GF-17, Inc., Irving, TX (US)

(72) Inventors: Cameron Sadler, Fort Worth, TX (US); Cynthia Jenkins, Irving, TX (US)

(73) Assignee: GF-17, Inc., Irving, TX (US)

( * ) Notice: Subject to any disclaimer, the term of this patent is extended or adjusted under 35 U.S.C. 154(b) by 0 days.

(21) Appl. No.: 17/726,845

(22) Filed: Apr. 22, 2022

Related U.S. Application Data

(63) Continuation of application No. 16/572,041, filed on Sep. 16, 2019, now Pat. No. 11,334,587, which is a continuation of application No. 15/406,574, filed on Jan. 13, 2017, now Pat. No. 10,417,249.

(60) Provisional application No. 62/279,662, filed on Jan. 15, 2016.

(51) Int. Cl.
| | |
|---|---|
| *G06F 17/00* | (2019.01) |
| *G06F 16/25* | (2019.01) |
| *G06F 9/451* | (2018.01) |
| *G06N 3/006* | (2023.01) |
| G06F 3/0484 | (2022.01) |
| G06F 3/0482 | (2013.01) |

(52) U.S. Cl.
CPC .......... *G06F 16/252* (2019.01); *G06F 9/451* (2018.02); *G06N 3/006* (2013.01); *G06F 3/0482* (2013.01); *G06F 3/0484* (2013.01)

(58) Field of Classification Search
CPC ...... G06F 16/252; G06F 9/451; G06F 3/0482; G06F 3/0484; G06N 3/006
See application file for complete search history.

(56) References Cited

U.S. PATENT DOCUMENTS

| | | | |
|---|---|---|---|
| 6,754,647 B1 * | 6/2004 | Tackett | G06F 40/35 |
| | | | 706/20 |
| 7,861,252 B2 | 12/2010 | Uszok et al. | |
| 9,043,407 B1 | 5/2015 | Gaulke et al. | |

(Continued)

OTHER PUBLICATIONS

S. Kameshwaran et al., Optimal buying from online retailers offering total value discounts. In Proceedings of the 10th international conference on Electronic commerce, Association for Computing Machinery, Article 21, 1-5 .<https://doi.org/10.1145/1409540.140> Aug. 2008.*

(Continued)

*Primary Examiner* — Greta L Robinson
(74) *Attorney, Agent, or Firm* — Foley & Lardner LLP

(57) ABSTRACT

Systems, methods, and computer-readable storage media for using bots. One method includes receiving, from a user device, an input indicative of a selection of a bot, and retrieving data associated with a user of the user device. Further, the method includes identifying a selection of bot options based on analyzing the user data, and presenting, via the user device, the selection of bot options. Further, the method includes receiving, from the user device, a selection of an option from the selection of bot options, and retrieving user payment information and shipping information based on the user data and populate one or more fields associated with the selection of the option. Further, the method includes presenting, via the user device, a confirmation page to confirm the populated one or more fields.

20 Claims, 15 Drawing Sheets

(56) References Cited

U.S. PATENT DOCUMENTS

| | | | |
|---|---|---|---|
| 10,121,176 B2* | 11/2018 | Buezas | G06Q 30/0613 |
| 10,417,249 B1 | 9/2019 | Sadler et al. | |
| 2003/0217105 A1 | 11/2003 | Zircher et al. | |
| 2004/0205772 A1 | 10/2004 | Uszok et al. | |
| 2013/0144961 A1* | 6/2013 | Park | H04L 67/62 |
| | | | 709/206 |
| 2016/0044380 A1 | 2/2016 | Barrett | |
| 2016/0162582 A1 | 6/2016 | Chatterjee et al. | |

OTHER PUBLICATIONS

Greg Buehrer et al., A large-scale study of automated web search traffic. In Proceedings of the 4th international workshop on Adversarial information retrieval on the web, Association for Computing Machinery, 1-8, <https://doi.org/10.1145/1451983.1451985>, Apr. 2008.*

* cited by examiner

SYSTEM AND METHOD FOR CREATING AND SHARING BOTS

CROSS-REFERENCE TO RELATED APPLICATIONS

This application is a continuation of U.S. patent application Ser. No. 16/572,041, entitled "System and Method for Creating and Sharing Bots," filed on Sep. 16, 2019, which is a continuation of U.S. patent application Ser. No. 15/406,574, entitled "System and Method for Creating and Sharing Bots," filed Jan. 13, 2017, which claims the benefit of and priority to U.S. Provisional Patent Application No. 62/279,662, entitled "System and Method for Creating and Sharing Bots," filed Jan. 15, 2016, each of which is incorporated herein by reference in their respective entireties and for all purposes.

FIELD

The present disclosure relates generally to a platform for providing artificial intelligence to streamline and simplify various processes implemented by users of a system. More specifically, but not by way of limitation, the present disclosure relates to a system and method for reducing labor overhead of data processes by using artificial intelligence to automate tasks and minimize user input, for instance, converting unstructured data into structured data, products, or services.

BACKGROUND

The statements in this section merely provide background information related to the present disclosure and may not constitute prior art.

Frequently users desire to interact with a computer network, for instance a computer network controlling and supporting communications among networked devices as well as facilitating awareness of networked devices of off-network communications and context environments, however data representative of the communications and context environments frequently exists in an unstructured form so that the data is difficult to access, process, and utilize, thus causing inefficiencies in network operation and slow processing by networked devices.

SUMMARY

Disclosed herein is system including one or more databases hosted on one or more servers having non-transitory machine-readable memory, the one or more databases configured to store user data associated with a user of the system, and one or more bots. The system further including a computer having a data structuring sub-unit configured to execute one or more graphical user interfaces for interfacing with the user by synthesizing structured data from unstructured data, wherein the data structuring sub-unit includes an unstructured data collection module configured to gather unstructured data, a mask data ingesting engine configured to access a mask repository and ingest mask data including a filter to create an assigned user path, and a path execution engine configured to execute a user path whereby an assigned user path is assembled for presentation to a user. The data structuring sub-unit further includes a deliverable synthesis module configured to display structured data including one or more element of the assigned user path via a graphical user interface and configured to position the one or more element to be mutually non-interfering with a further element of the assigned user path. In various embodiments, the element is the bot.

In various embodiments, the gathering of unstructured data includes collecting an interest from a user corresponding to at least one of the unstructured data, a user selection, and a random assignment.

Moreover, the mask data may include a filter configured to select a first element of unstructured data and deselect a second element of unstructured data to create an assigned user path.

Furthermore, a user path mask engine may establishes the user path by masking path elements drawn from a user path repository according to at least one of user data and business data within a user profile, third-party data source, and from a sensor overseer, wherein the user path mask engine communicates the path elements to a mask data ingesting engine including a mask repository submodule.

In addition, the mask data ingesting engine may be further configured to access the mask repository submodule to retrieve path elements drawn from the user path repository, evolve the user profile to update the user path by masking path elements drawn from the user path repository, and further evolve the mask applied in response to at least one of unstructured and structured data provide by the sensor overseer.

In various embodiments, the path execution engine is configured to display bots related to at least one of a specific industry, work opportunities in the specific industry, and educational opportunities in the specific industry. Furthermore, the path execution engine may be configured to provide notifications via a notification generator revealing the elements of the user path via a graphical user interface.

The path execution engine may be configured to create data linkages associating the unstructured data with the user path; and evolve the user profile in response to changes in the data linkages. Additionally, the path execution engine may be further configured to actively recreate the graphical user interface in response at the direction of an I/O module in conjunction with an evolution controller, wherein data is arranged in a non-interfering visual pattern.

As disclosed herein, in various instances, the creating the assigned user path includes analyzing user data and business data to determine an interest of the user, and further includes identifying one or more bots corresponding to the interest of the user.

In various embodiments, the deliverable synthesis module includes a screen element selector configured to select a first subset of the structured data for display and a second subset of the structured data for which aspects of the structured data to display in response to at least one of network congestion and graphical user interface size limitations, and a visual interference detector configured to detect at least one of an actual and potential interference among one or more element arranged on the graphical user interface and configured to direct the screen element selector to at least one of select, deselect, and move elements to ameliorate interference.

Various methods are also disclosed herein. For instance, a method of synthesizing structured deliverable data from unstructured data by a computer data structuring sub-unit configured to execute one or more graphical user interfaces for interfacing with the user by a method of synthesizing structured deliverable data from unstructured data is disclosed. In various embodiments, the method of synthesizing structured deliverable data from unstructured data includes gathering, by an unstructured data collection module, unstructured data, accessing, by a mask data ingesting engine, a mask repository and ingesting mask data including a filter to create an assigned user path, and executing, by a path execution engine, a user path whereby an assigned user path is assembled for presentation to a user. In various embodiments, the method further includes displaying and positioning, by a deliverable synthesis module, an element of the assigned user path via a graphical user interface to be mutually non-interfering with a further element of the assigned user path.

In various embodiments, the step of the gathering unstructured data includes collecting, by the unstructured data collection module, an interest from a user corresponding to at least one of the unstructured data, a user selection, and a random assignment.

In various embodiments, the method also includes the steps of establishing, by the user path mask engine, the user path by masking path elements drawn from a user path repository according to at least one of user data and business data within a user profile, third-party data source, and from a sensor overseer, and communicating, by the user path mask engine, the path elements to a mask data ingesting engine having a mask repository submodule.

Moreover, the method may also include accessing, by the mask data ingesting engine, a mask repository to retrieve path elements drawn from the user path repository, evolving, by the mask data ingesting engine, the user profile to update the user path by masking path elements drawn from the user path repository, and further evolving, by the mask data ingesting engine, the mask applied in response to at least one of unstructured and structured data provide by a sensor overseer.

The executing a user path may include displaying bots related to at least one of a specific industry, work opportunities in the specific industry, and educational opportunities in the specific industry.

The method according to claim 13 may include creating, by the path execution engine, data linkages associating the unstructured data with the user path, and evolving, by the path execution engine, the user profile in response to changes in the data linkages.

In addition, displaying and positioning, by the deliverable synthesis module, the element of the assigned user path via the graphical user interface to be mutually non-interfering with the further element of the assigned user path may include steps of selecting, by a screen element selector, a first subset of the structured data for display and a second subset of the structured data to be non-displayed, in response to at least one of network congestion and graphical user interface size limitations, and detecting, by the visual interference detector, at least one of an actual and potential interference among one or more element arranged on the graphical user interface and configured to direct the screen element selector to at least one of select, deselect, and move elements to ameliorate interference.

A processor is disclosed. The processor may include a plurality of modules interconnected by a bus to a bus controller which directs communication among the modules. The plurality of modules may include a directive transceiver configured to transmit and receive instructions to a user via a graphical user interface presented on a user device, wherein the directive transceiver interoperates with an I/O module to structure elements on the graphical user interface of the user device. The plurality of modules may include a smart data extraction engine configured to access at least one of a sensor data provided by a sensor overseer and a public-facing data from a third-party resource, and further configured to retrieve the data in an unstructured form and provide it to the bus. The plurality of modules may include an alignment translator configured to interoperate with the I/O module to at least one of translate, scale, and selectively omit graphical user interface elements corresponding to structured data derived from the unstructured data so that the graphical user interface elements exist in a non-interfering pattern. Moreover, the plurality of modules may include a user path mask engine configured to ingest unstructured data provided by the smart data extraction engine and mask user path elements retrieved from a user path repository to select a selected user path for the user, a profile randomizer configured to assemble a user profile having at least one of structured data regarding the user stored in a platform user database, randomly selected unstructured data, and a combination thereof, and a profile sentinel configured to interoperate with the I/O module to monitor unstructured data and structured data and update the user profile in response to at least one of the unstructured data and the structured data. In various embodiments, the plurality of modules further includes an evolution controller configured to direct the profile sentinel to cause automatic updates to the user profile in response to a change to at least one of the structured data and the unstructured data, a bot creation engine configured to interoperate with an I/O module whereby a user may create at least a script configured to ingest the unstructured data and output the structured data, and a bot utilization engine configured to interoperate with the I/O module to display a first bot to a user corresponding to the user profile and hide a second bot from the user not corresponding the user profile. Finally, in various embodiments, the plurality of modules may include a notification generator configured to direct the user to interact with a context environment including a network device and configured to direct the evolution controller to automatically revise a user profile whereby the second bot is unhidden, and a sensor overseer configured to interface with a sensor and relay sensor data to the evolution controller, whereby the user profile is revised. Further embodiments and apparatuses, including other areas of applicability, will become apparent from the description provided herein. It should be understood that the description and specific examples are intended for purposes of illustration only and are not intended to limit the scope of the present disclosure in any manner.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1A:
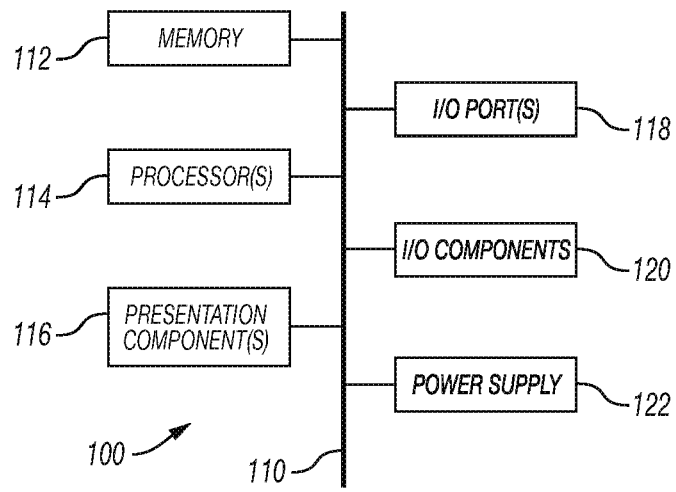
FIG. 1A illustrates a block diagram of an exemplary special-purpose computer for creating and sharing bots, in accordance with various embodiments.

The present disclosure is generally described in detail with reference to embodiments illustrated in the drawings. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Embodiments of the present disclosure relate to methods, systems, and computer storage media having computer-executable instructions embodied therein that, when executed, perform methods in accordance with embodiments hereof, for creating and sharing bots. The disclosed system and method reduces the labor overhead that burdens the processing units that run the program and process user inputs, and improves the ability of the processing units to display information and interact with the user. This may be accomplished in some embodiments by reducing the data gathering required to accomplish specific tasks desired by the user in a manner that reduces labor overhead burdening the processing units operating in accordance with the disclosed system or improves the ability of the processing units to display information and interact with the user. For instance, the system adaptably arranges structured data in a user interface ameliorating visual interference among aspects of structured data being displayed.

In various embodiments, a system is provided for automating or otherwise streamlining data manipulation so as to capture unstructured data and responsive to inputs, provide structured data, improving the efficiency of system operation and managing processor and network load. The system may monitor and direct user activities so as to allow the user to capture spend less time managing activities that may be automated by the system. This provides the benefits of reducing user input to the system, which reduces the processing labor overhead required to perform these activities if the user was otherwise performing the activities himself. Through the use of bots, the system is also capable of streamlining the user's experience by reducing the input required from the user, so that the user may accomplish tasks or goals with minimal input and structure data output by bots may be arranged in a non-interfering, adaptable way. In addition to reducing the processing labor overhead, this also improves the ability of the processors to display information and interact with the user because the user is able to accomplish more tasks with less input than would otherwise be possible without the system.

In various example embodiments, the system may serve three communities, such as customers, creators, and suppliers. As discussed herein, a customer may be a person who wants to use products and services generated within the system. A creator may be a person who wants to embark on a journey of creating products and services, for instance, by utilizing bots. A supplier may be a person who fulfills the delivery of products and services to customers, again, for instance, by using bots or by taking directives from bots via a user device.

For example, one scenario used as an example in this disclosure is a customer purchasing a pair of shoes in the system which is designed by another system user and fulfilled through integration with third-party APIs (such as a Nike or Amazon API) or fulfilled through supply chain partners or other system users. A creator embarks on a journey of creating her own shoe. Her profile is created with random, unstructured data. Once she reaches a certain level, the system will automatically structure her data to create a stronger profile. The system then pulls her profile and begins to design her shoe (with user input), it sends the shoe to a supplier who 3D prints it and ships to the customer who purchased.

Moreover, certain concepts relate advantageously to the aspects of the system disclosed herein. For instance, the system may be sensor driven, meaning an apparatus attached to user will capture user's location, environment noise level and digital interactions. The system may include randomizing of user data, particularly for new users, meaning that the system will automatically update user's profile with random data. This builds the user's profile based on random assumptions. The user may be provided with a map of experiences, such as depicted in FIGS. 20A-C, wherein users can see past locations, environment noise levels and digital interactions via a map built into system. Moreover, via the interface of FIGS. 20A-C, the system enables user experience input, meaning users can adjust their locations, environment noise levels and digital interactions to change random assumptions. The system may provide structured data which may include a structured product or a structured service. This means the system will automatically develop custom products and services (BOT) based on user's profile. As used herein, a bot may include an automated action. Furthermore, patternless decisions may be provided, which include a set of randomized reversible automated actions.

The system may intake unstructured data. This may include information automatically collected and stored in random fields. The system may analyze unstructured data. Thus, the system may automatically structure the unstructured data once triggered by user's profile ranking. The system may also create data relationships. This means the system will automatically generate new structured databases once triggered. The system may determine the user's path. In other words, the system will use newly generated structured databases to create a path for users. Also, a user path or user's path may include an industry identified by system based on structured database and a real time trajectory in along that path, meaning the system will display structured database to user as it is being formed. As mentioned, a user profile may exist, which is an editable but automatically generated user identity. Also, the system may structure products and services to provide automatic real time fulfillment of needs and wants. Among those structured data outputs provided to a user, a project task list and schedule may include a logistical requirement for structured product or service fulfillment.

Finally, communications among entities and modules discussed herein may include bidirectional communication, meaning that data can be automatically generated and structured by the system for a user, and a user may also manipulate their own data to generate the profile of their choice, including offering their own personal data for sale. The system also contemplates bidirectional communication to suppliers, meaning that structured products or service can be automatically generated, and suppliers can also request modifications to structured products or services, for instance, those the supplier is called on by the system to fulfill.

Aspects of the systems, for instance, various system actors such as users or a system operator may be autonomous business organizations. Similarly, various structured products and services may be associated with third party autonomous business organizations, meaning an organization operating without boards of directors or management teams. Finally, reference may be made to user progress or similar concepts, meaning a measurement of user production (number of user profile updates, number of launched products and services, number of fulfilled products and services, etc.). A user may also provide input, so that the concept of monitoring user input includes actively monitoring user location, context environments and digital interactions.

Having briefly described an overview of embodiments of the present disclosure, an exemplary operating environment implementing various aspects of the present disclosure is described below.

Referring to the drawings in general, and initially to FIG. 1A in particular, an exemplary operating environment for implementing embodiments of the present disclosure is shown and designated generally as computing device 100. Computing device 100 is but one example of a suitable computing environment and is not intended to suggest any limitation as to the scope of use or functionality of the present disclosure. Neither should the computing environment 100 be interpreted as having any dependency or requirement relating to any one or combination of components illustrated.

The present disclosure may be described in the general context of computer code or machine-useable instructions, including computer-executable instructions such as program components, being executed by a computer or other machine, such as a personal data assistant, smartphone, tablet, or other such devices. Generally, program components including routines, programs, objects, components, data structures, and the like, refer to code that performs particular tasks, or implement particular abstract data types. Embodiments of the present disclosure may be practiced in a variety of system configurations, including hand-held devices, consumer electronics, general-purpose computers, specialty computing devices, etc. Embodiments of the present disclosure may also be practiced in distributed computing environments where tasks are performed by remote-processing devices that are linked through a communications network.

With continued reference to FIG. 1A, computing device 100 includes a bus 110 that directly or indirectly couples the following devices: memory 112, one or more processors 114, one or more presentation components 116, input/output (I/O) ports 118, I/O components 120, and a power supply 122. Bus 110 represents what may be one or more busses (such as an address bus, data bus, or combination thereof). Although the various blocks of FIG. 1A are shown with lines for the sake of clarity, in reality, delineating various components is not so clear. That is, the various components of FIG. 1A may be integrated into a single component, or the various components of FIG. 1A may be parsed into any number of additional components. For example, in some circumstances a presentation component 116, such as a display device, may be an I/O component 120. Likewise, in some instances, a processor 114 may comprise memory 112. As such, it should be appreciated that the diagram of FIG. 1A is merely illustrative of an exemplary computing device that can be used in connection with one or more embodiments of the present disclosure. Distinction is not made between such categories as "workstation," "server," "laptop," "hand-held device," "smartphone," etc., as all are contemplated within the scope of FIG. 1 and reference to "computer," "computer device," "computing device," and other similar terms known to one of ordinary skill in the art.

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by, for example, computing device 100.

Memory 112 (also referred to herein as a database) includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as, for example, memory 112 or I/O components 120.

Presentation components 116 present data indications to a user or other device. Exemplary presentation components 116 may include a display device (also referred to as a visual display), speaker, printing component, and haptic-feedback component, among others. I/O ports 118 allow computing device 100 to be logically coupled to other devices including I/O components 120, some of which may be built-in. Illustrative components include a microphone, joystick, game pad, satellite dish, scanner, printer, wireless device, mouse, keyboard, and touchscreen components, among others.

Figure 1B:
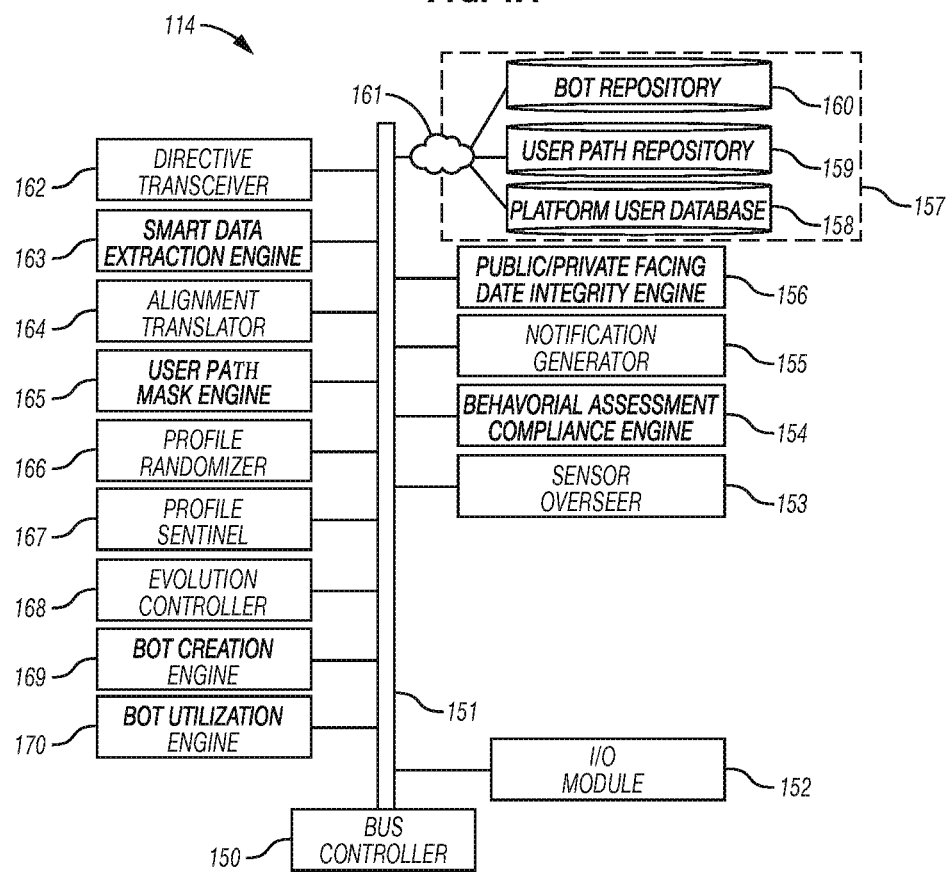
FIG. 1B illustrates a block diagram of an exemplary bot creation and sharing processor of the special-purpose computer according to FIG. 1A, in accordance with various embodiments.

With reference to FIG. 1B, processor 114 may comprise various logical modules. For instance, a plurality of modules may be interconnected by a bus 151 to a bus controller 150 which may direct communication among the modules and among external resources such as via an I/O (input/output) module 152.

For example, a processor 114 may comprise a directive transceiver 162. A directive transceiver 162 may transmit or receive instructions between a user and aspects of processor 114, as further described herein. The directive transceiver 162 may transmit instructions to a user, via a GUI present on a user device, to execute one or more task. For example, a directive transceiver 162 may instruct a user to meet another user. Moreover, a directive transceiver 162 may interoperate with an I/O module 152 to structure elements on a GUI of multiple users, for instance, instructing two or more users to meet, and then providing corresponding queries to the user to complete.

A processor 114 may comprise a smart data extraction engine 163. A smart data extraction engine 163 may access data resources, for instance, sensor data provided by a sensor overseer 153, or public-facing data from third-party resources, for instance, the Internet, or credit reporting agencies, or transaction data, or location data and/or the like. The smart data extraction engine 163 may retrieve such data in an unstructured form and provide it via the bus 151 to other aspects of the processor 114 for structuring and further processing.

A processor 114 may comprise an alignment translator 164. An alignment translator 164 may interoperate with an I/O module 152 to, responsive to the structuring of data by aspects of the processor 114, arrange the structured data in GUI elements (for instance, as depicted in FIGS. 10, 17, 18, and 21A-C), for non-interfering display. Because the structured data may change and may require differing amounts of space for display, or different categories of structured data may be displayed at different times (for instance, charts, drawings, radio buttons, textual items), the alignment translator 164 may translate GUI elements in any direction, scale, or selectively include or omit elements based on data received at the I/O module 152, such as data indicative of device type, priority of data to be displayed in view of context environment, and/or the like.

A processor 114 may comprise a user path mask engine 165. A user path mask engine 165 may ingest unstructured data and may establish and/or modify a user path by masking available user paths from user path repository 159 to select a particular ("selected") path for a particular user.

A processor 114 may comprise a profile randomizer 166. For example, each user may have a profile comprising all structured and unstructured data regarding that user stored in the platform user database 158 and/or provided by third-party resources via the I/O module 152. However, in various embodiments, little or no data is available for a user, or the system, such as for a new user, disregards available information and instantiates a profile for the user comprising randomly selected data not specifically filtered according to data regarding that user, or comprising randomly selected subsets of data regarding that user.

A processor 114 may comprise a profile sentinel 167. A profile sentinel 167 may, in coordination with the I/O module 152, monitor unstructured data, for instance, user inputs and monitor structured data, for instance, a user's editing of the user's profile and may update records, such as those stored in or provided to the user path repository 159, the user path mask engine 165, and the directive transceiver 162 in response to the user's editing of the user's profile.

A processor 114 may comprise an evolution controller 168. An evolution controller 168 may direct the profile sentinel 167 to cause automatic updates to the user's profile based on changes to data regarding the user. For instance, the platform user database 158 may comprise a database of all interactions between a user and the system as well as between a user and other users on the system. The evolution controller 168 thus interoperates with the platform user database 158 to direct the profile sentinel 167 to update a user profile. In response, a user path mask engine 165 may further amend a user path, and vice versa.

A processor 114 may comprise a bot creation engine 169. A bot comprises a script, combination of scripts, template, and or the like configured to ingest unstructured data and output structured data. The bot creation engine 169 interoperates with an I/O module 152 so a user may actively create new bots and modify existing bots.

A processor 114 may comprise a bot utilization engine 170. A bot utilization engine 170 may load a bot and may interoperate with any of the other modules disclosed herein in order to effectuate the transformation of the unstructured data into structured data by the bot. The bot utilization engine 170 may interoperate with the I/O module 152 to display a first bot to a user corresponding to the user profile and hide a second bot from the user not corresponding the user profile.

A processor may comprise a bot repository 160 a user path repository 159 and a platform user database 158, though in further embodiments, the processor may be separated from these aspects by a network 161, so that the connection is provided logically with assistance of an I/O module 152. A bot repository 160 may comprise a database storing all bots. A user path repository 159 may comprise a database storing all potential user path elements which may comprise a user path, and storing masked user paths provided by the user path mask engine 165 that are specific to specific users. A platform user database 158 may comprise a database of all users and/or all structured and/or unstructured data regarding a user.

A processor may comprise a public/private facing data integrity engine 156. In various embodiments, private data not for disclosure to other users is processed to provide structured data for display by an alignment translator 164. The public/private facing data integrity engine 156 may oversee the transfer of data from user's to system aspects, and the transfer of data from system aspects to a GUI and maintain the relative privacy of private-facing data and the relative publicity of public-facing data. For instance, the public/private facing data integrity engine 156 may set, change, and monitor flags associated with data, or may read the content of data to determine if private data is mixed with public data, such as by machine learning, string recognition, image recognition, and/or the like.

The processor may comprise a notification generator 155. In various instances, the system may provide alerts to a user, such as to direct the user to interact with other users, machines, network devices, or other aspects of a context environment in which a user is operating. A context environment comprises the surrounding conditions, location, individuals, and tasks proximate to a user, as well as the relevant characteristics of the user related to interaction with the surrounding conditions, location, individuals, and tasks proximate to the user as well as networked devices that the user may interact with, and the specific interactions that the user makes with the networked devices. Such networked devices may include smartphones, tablets, browser sessions, and/or the like. For instance, a user may be directed to communicate with a subject matter expert having specific knowledge related to an element of a user path set by a user path mask engine 165. The user may be notified by a notification generator 155 a time and place to engage in the communication. Subsequently, the notification generator 155 may provide a notification to the user path mask engine 165 and the evolution controller 168 directing an automatic revision to a user profile so that a new and/or different bot, such as the hidden second bot, is unhidden, and/or element of a user path may be selected from the user path repository 159 by the user path mask engine 165 and the alignment translator 164 may display a element on a GUI indicative of the notification and or user path element.

The processor may comprise a behavior assessment and compliance engine 154. A behavior assessment and compliance engine 154 may actively monitor interactions of a user with the system; for instance, interactions with the context environment, such as with other users having other networked devices communicative with the user's own networked devices, interactions with the notification generator 155, interactions with the profile sentinel 167, and interactions with the sensors monitored by the sensor overseer 153. In response to a failure to complete aspects of a user path, or in response to behavior harmful to other users or deleterious to the system, the behavior assessment and compliance engine 154 may terminate or limit access to aspects of the system by the user.

Finally, the processor may comprise a sensor overseer 153. A sensor overseer 153 may interface various sensors to the processor 114 and may control operation of sensors and may relay sensor data to other modules such as the evolution controller 168 and user path mask engine 165 to characterize a context environment. For example a vision sensor may be emplaced and may detect and identify interactions between the user and other users, such as by facial recognition. A sound sensor may be emplaced and may detect and identify patterns of life in a user, such as sleep/wake cycles, types of locations (coffee shop, movie theater, gymnasium) based on sensed sounds, and entertainment preferences of a user.

Figure 1C:
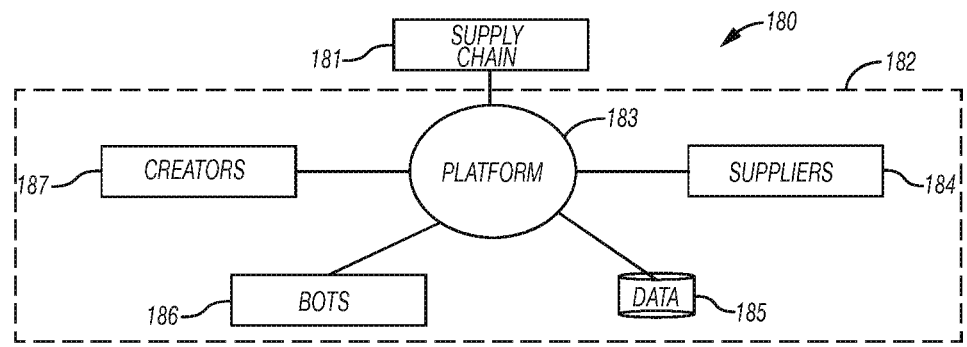
FIG. 1C illustrates a block diagram of example aspects of a networked context environment, in accordance with various embodiments.

While various aspects of a processor 114 of a system have been discussed, attention is now directed to FIG. 1C and an associated discussion of different system 180 components which may comprise devices containing a processor 114. For instance, a platform 183 may reside in a server and may have one or more processor 114. The platform 183 may enable communication among other system aspects and may ingest data 185, structured and unstructured, as well as may provide data 185 that is structured. For instance, a creator 187 may comprise a user who in certain context environments adopts a role of creating and/or modifying bots 186 stored in a bot repository 160 (FIG. 1B). A supplier 184 may be a user who in certain context environments adopts a rule of following instructions provided by a bot 186, for instance, a processor 114 (FIG. 1B) with a behavior assessment and compliance engine 154 (FIG. 1B) may monitor notifications provided by a notification generator 155 (FIG. 1B) and alterable by a user path mask engine 165 (FIG. 1B) a user path stored in the platform user database 158 (FIG. 1B). In this manner a bot 186 may direct a supplier 184 to accomplish tasks off-system to effectuate operation of a bot created by a creator 187. Moreover, the platform 183 may interface with external supply chains 181 that are outside system 182 and interconnected by communication links such as the Internet, to further accomplish tasks off-system to effectuate operation of a bot 186 created by a creator 187 (FIG. 1B). For instance, a bot 186 may require the provision of a product for modification (for instance, shoes for customization) and the supply chain 181 may provide the shoes and/or customization hardware or services.

Figure 2:
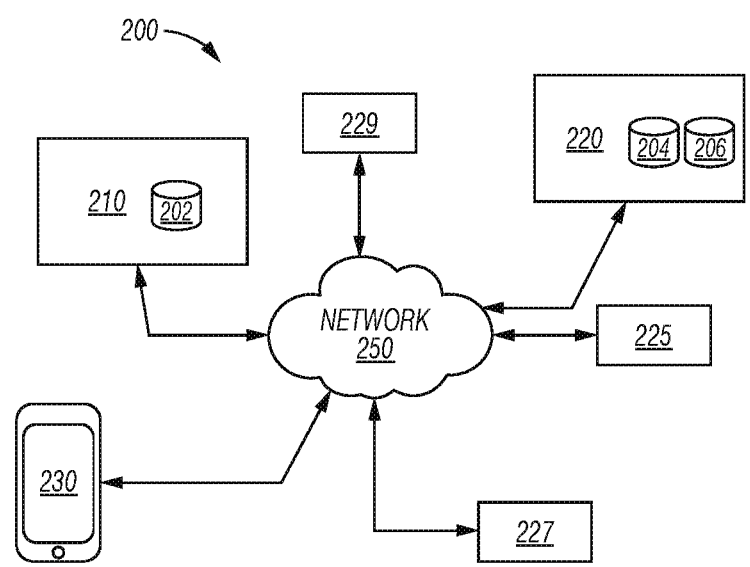
FIG. 2 is a block diagram of a system for use in implementing an embodiment of the present disclosure operating in a networked context environment according to FIG. 1C.

Reference is now made to FIGS. 1A-1C, as well as FIG. 2, which illustrates an exemplary embodiment of a networked device environment 200 which may include one or more system 180. Network device environment 200 may include as a logical aspect therein, the system 180 (FIG. 1B) which therein may include processors 114 (FIG. 1A). The networked device environment 200 is merely an example of one suitable environment and is not intended to suggest any limitation as to the scope of use or functionality of the present disclosure. Neither should the networked device environment 200 be interpreted as necessarily having any dependency or requirement related to any single component or combination of components illustrated therein.

The networked device environment 200 includes one or more servers, such as server 210. The one or more servers may host databases storing data related to various aspects of the networked device environment 200, including data for interfacing with users of the networked device environment 200. In the embodiment illustrated in FIG. 2, the server 210 is a user server for performing user data mining (as described below), setting up user accounts, receiving user input, processing user input, and other tasks. In some embodiments, the data stored in the databases 202 may include user data, which may include any data related to a user of the networked device environment 200, and one or more bots, which are comprised of executable code for performing tasks, including automated tasks. In the embodiment illustrated in FIG. 2, the bots are stored in a bot database 204, which is also known as the bot repository 160. Although the bot database 204 is shown as being hosted on server 220, it should be appreciated that the bot database 204 may be hosted in other locations and may be considered logically an aspect of a processor 114 as shown in FIG. 1B.

The user data is information relevant to a user of the networked device environment 200. A user may include an individual person, or a company or vendor. The user data may include information about the user such as, for example, the user's address, age, height, or any other information that is related to the user. This other information may include data associated with various accounts pertaining to a user (e.g., FACEBOOK accounts, TWITTER accounts, etc.), or any other information relevant to the user. In some embodiments, a user manually inputs the user data. In some embodiments, a user grants access to their various accounts, and the networked device environment 200 mines data associated with the various accounts to populate the user data with information obtained from the data mining. In further embodiments the networked device environment 200 mines data associated with the user from third-party sources not associated with user accounts, such as by mining public records, network traffic, and the like. The user data may also include information such as user preferences, user activities, or any other information that may be determined from a user's activities including patterns and inferences drawn from the user's activities or patterns. The user data may be used to produce a user profile for interfacing with the networked device environment 200.

In some embodiments, the networked device environment 200 includes additional servers for performing tasks associated with operating the networked device environment 200. Example servers may include a bot server 220 (for example, a bot creation engine 169) for generating bots, executing bots (for example a bot utilization engine 170), storing bots in the bot database 204 (for example, bot repository 160), storing bot templates in a template database 206 (for example, bot repository 160), determining relevant bots (e.g., bots that are trending among users, and bots that were recently used by a particular user), and for handling other tasks related to building, executing, and/or managing bots such as, for example, allowing particular bots to be duplicated and/or revised.

Another example server includes a messenger server 225 for operating messenger programs. The messengers programs provide a platform for users to communicate through the networked device environment 200.

Another example server includes server 227 for managing an Artificial Intelligence Personal Assistant (AIPA) that is capable of serving as an interface between a user and the networked device environment 200. The AIPA server 227 may, in some embodiments, provide automated interaction with a user. For example, the AIPA server 227 is capable of requesting information from a user, assisting a user with searching for a particular bot, assisting a user with solving a problem or accomplishing a goal, making recommendations to a user, and using artificial intelligence to interact with a user in various other ways. In various aspects, the AIPA is a logical representation of aspects of the processor 114.

The networked device environment 200 also includes a miscellaneous server 229 for performing other tasks such as generating graphical user interfaces (GUI), displaying GUIs to users, operating Internet browsers, or performing any other tasks or operations disclosed herein. It should be appreciated that various operations described herein with respect to a particular server may alternatively (or additionally) be performed by other servers or components comprising the networked device environment 200, including aspects of processor 114 disclosed in FIG. 1B.

The networked device environment 200 also includes a user computing device 230 for interfacing with the networked device environment 200, wherein the user computing device 230 may be any type of computing device, such as device 100 described above with reference to FIG. 1A-C. By way of example only and not limitation, the user computing device 230 may be a personal computer, desktop computer, laptop computer, handheld device, cellular phone, digital phone, smartphone, PDA, or the like, having a processor 114. It should be noted that embodiments are not limited to implementation on such computing devices.

The networked device environment 200 also includes a network 250 for providing a data connection between each of the components of the networked device environment 200, wherein the data connection may be wired or wireless. The network 250 may include any computer network or combination thereof. Examples of computer networks configurable to operate as network 250 include, without limitation, a wireless network, landline, cable line, digital subscriber line (DSL), fiber-optic line, local area network (LAN), wide area network (WAN), metropolitan area network (MAN), or the like. The network 250 is not limited, however, to connections coupling separate computer units. Rather, the network 250 may also include subsystems that transfer data between servers or computing devices. For example, the network 250 may also include a point-to-point connection, the Internet, an Ethernet, an electrical bus, a neural network, or other internal system.

In an embodiment where the network 250 comprises a LAN networking environment, components may be connected to the LAN through a network interface or adapter. In an embodiment where the network 250 comprises a WAN networking environment, components may use a modem, or other means for establishing communications over the WAN, to communicate. In embodiments where the network 250 comprises a MAN networking environment, components may be connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Furthermore, the network 250 may also include various components necessary to facilitate communication with a mobile phone (e.g., cellular phone, Smartphone, Blackberry®). Such components may include, without limitation, switching stations, cell sites, Public Switched Telephone Network interconnections, hybrid fiber coaxial cables, or the like.

Components of the servers 210, 220, 225, 227, and 229 may include, without limitation, a processing unit, internal system memory, and a suitable system bus for coupling various system components, including one or more databases for storing information (e.g., files and metadata associated therewith). Each server may also include, or be given access to, a variety of computer-readable media. By way of example, and not limitation, computer-readable media may include computer-storage media and communication media. In general, communication media enables each server to exchange data via network 250. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that the networked device environment 200 is merely exemplary. While the servers 210, 220, 225, 227, and 229 are illustrated as single boxes, one skilled in the art will appreciate that they may be scalable. For example, the servers 210, 220, 225, 227, and 229 may in actuality include multiple boxes in communication and/or may be combined as elements of a single box, such as a processor 114. The depictions are meant for clarity, not to limit the scope of embodiments in any form.

The user computing device 230 may comprise a web browser, which is one or more software applications enabling a user to display and interact with information located on a web page, which may be a password-protected web page or online portal for users only. In an embodiment, the web browsers may communicate with servers 210, 220, 225, 227, and 229, and other components accessible over the network 250. The web browser may locate web pages by sending a transferring protocol and the URL. The web browser may use various URL types and protocols, such as hypertext transfer protocol (HTTP), file transfer protocol (FTP), real-time streaming protocol (RTSP), etc. The web browser may also understand a number of file formats—such as HTML, graphics interchange format (GIF), tagged image file format (TIFF), portable document format (PDF), or joint photographic experts group (PDF) file format, and the like—the wealth of which can be extended by downloaded plug-ins. Additionally, the web browser may be any browser capable of navigating the Web, such as Internet Explorer®, Netscape Navigator, Mozilla, Firefox, etc.

In operation, a user may access a web page using the web browser on the user computing device 230. The web page may be stored on a server such as, for example the servers 210, 220, 225, 227, or 229, which are configured to transmit the HTML and other content associated with the web page to the user computing device 230. The web browser may be configured to render the web page and display it to the user.

In essence, the networked device environment 200 provides a platform that serves as an interface between users of the networked device environment 200. The networked device environment 200 may be used to automate or otherwise streamline user activities such as paying bills, ordering goods or services, locating information, or performing other tasks so as to allow the user to spend less time managing activities that may be automated by the networked device environment 200. This also provides the benefits of reducing user input to the networked device environment 200, which reduces the processing labor overhead required to perform these activities if the user was otherwise performing the activities themselves. Through the use of bots, the networked device environment 200 is also capable of streamlining the user's experience by reducing the input required from the user, so that the user may accomplish tasks or goals with minimal input. In addition to reducing the processing labor overhead, this also improves the ability of the processors to display information and interact with the user because the user is able to accomplish more with less input than would otherwise be required without the networked device environment 200 and, more specifically, the bots.

A bot may accomplish various other interactions within a networked device environment 200 for instance, to transform unstructured data into structured data. For instance, a bot may ingest sensor data from a sensor overseer 153 regarding user behaviors. Moreover, a bot may allow a user to change the sensor data. The bot further coordinates activities related to unstructured data, for instance, identifying people, APIs, and other machines or servers which interactions are needed and unstructured data provided to and/or structured for provision to. IN this manner, the network operation is improved by the transaction of only relevant data among the various entities, rather than needing the retransmission of unstructured data among all entities, as well as reducing processor overhead by centralizing the transformation of unstructured data into structured data, eliminating duplicative processing within the networked device environment 200. Moreover, the bot may generate a user profile based on the unstructured data and further based on the structured data and interactions with other networked device environment components.

A bot may be created by users, for instance, a creator 187 (FIG. 2) or system administrators. A bot may be created by at least three ways: creating a new bot from a template, modifying an existing bot, or providing a bot through an application programming interface (API). Bots may be updated, duplicated, or deleted from the bot repository 160 (FIG. 2) by the user who created the bot or by an administrator of the networked device environment 200.

Figure 3:
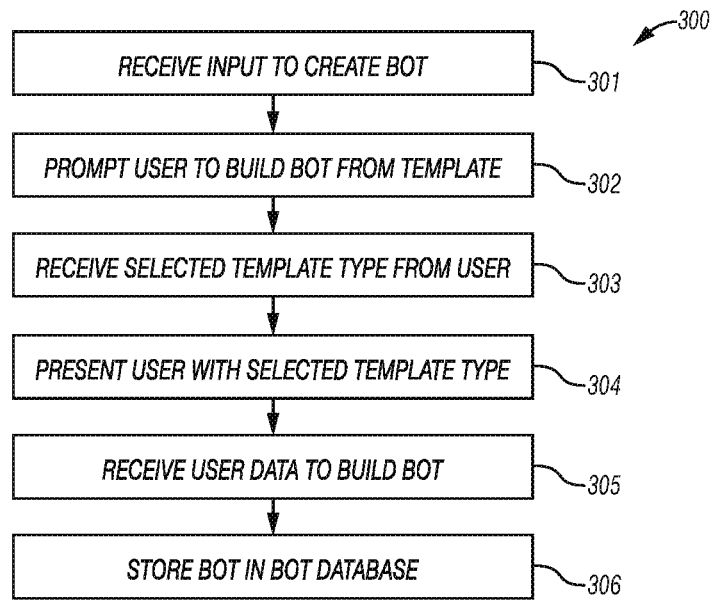
FIG. 3 illustrates an example flow chart of a method for creating a bot.
Figure 4:
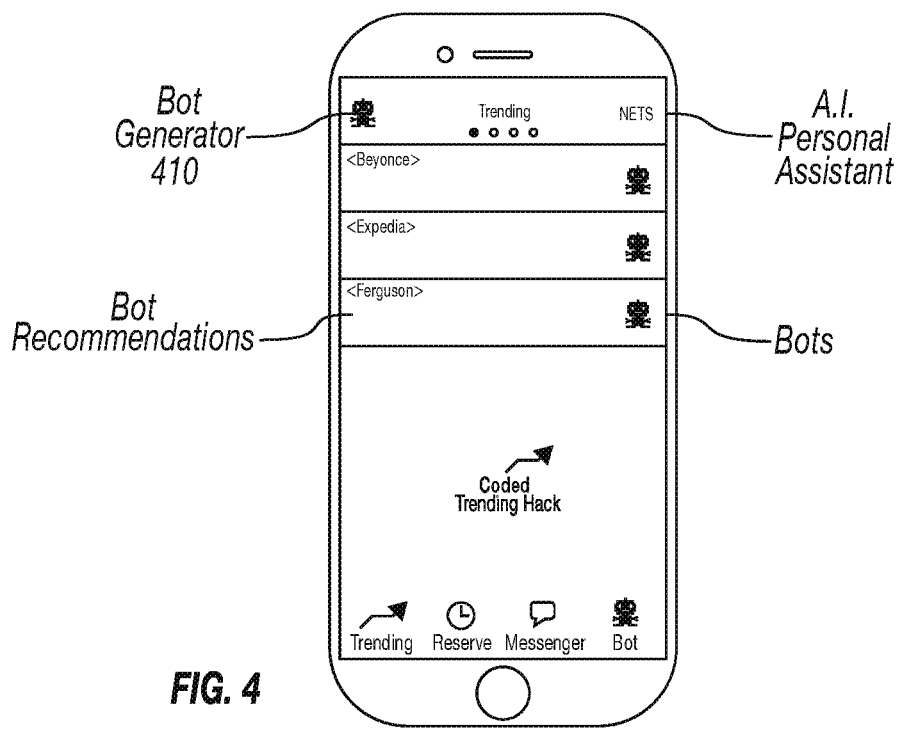
FIGS. 4-9 illustrate example screenshots corresponding to an example method for creating a bot.

For example, reference is now made to FIGS. 3-9. FIG. 3 provides an example flow chart of a method for creating a bot 300, and FIGS. 4-9 provide example screenshots corresponding to the disclosed example method for creating a bot. The method of FIG. 3 and screenshots of FIGS. 4-9 correspond to an example for creating a bot for buying a ticket to an event.

Figure 5:
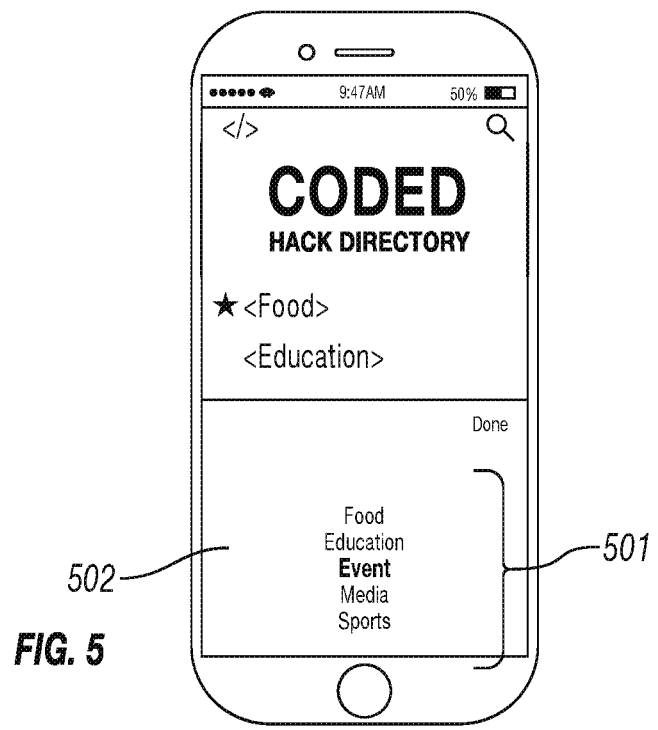
Figure 6:
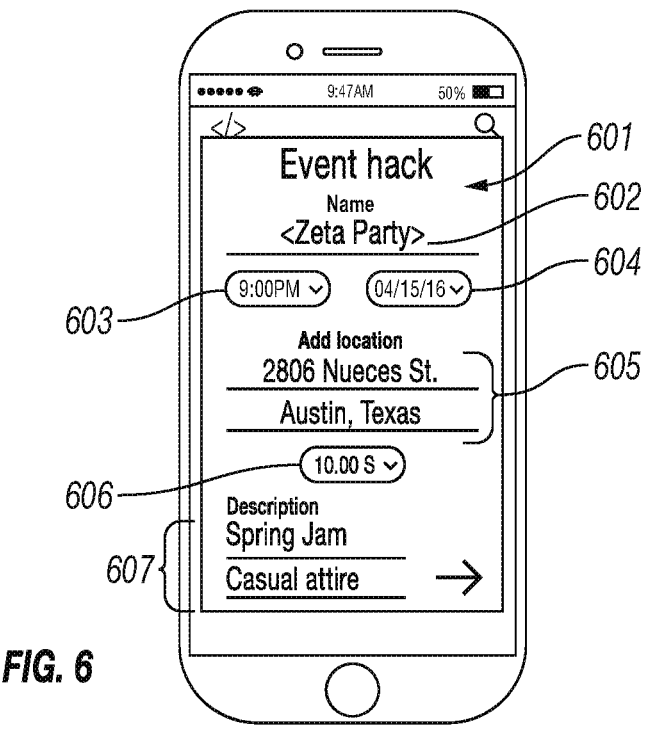
Figure 7:
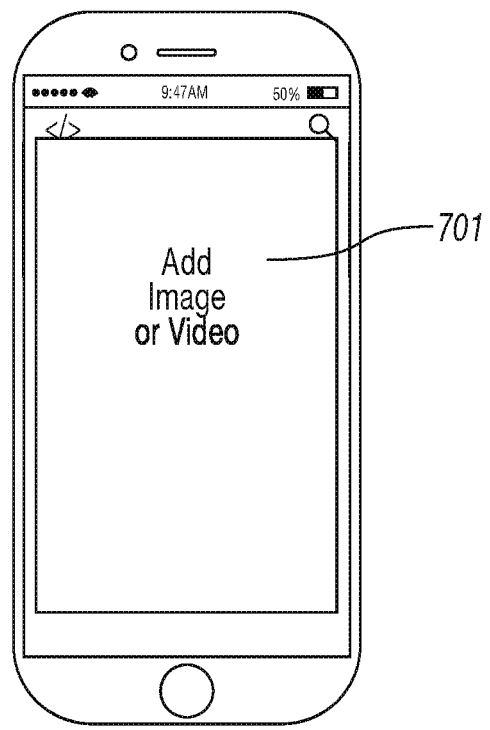
Figure 8:
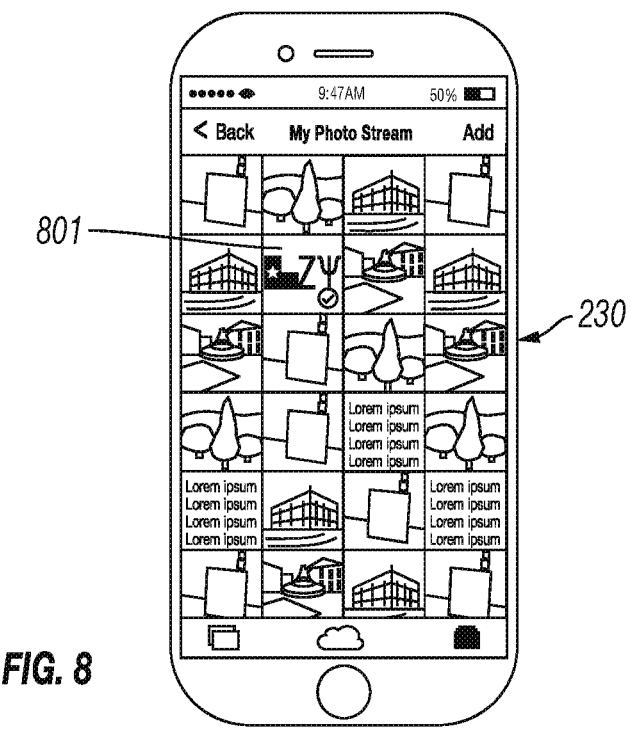
Figure 9:
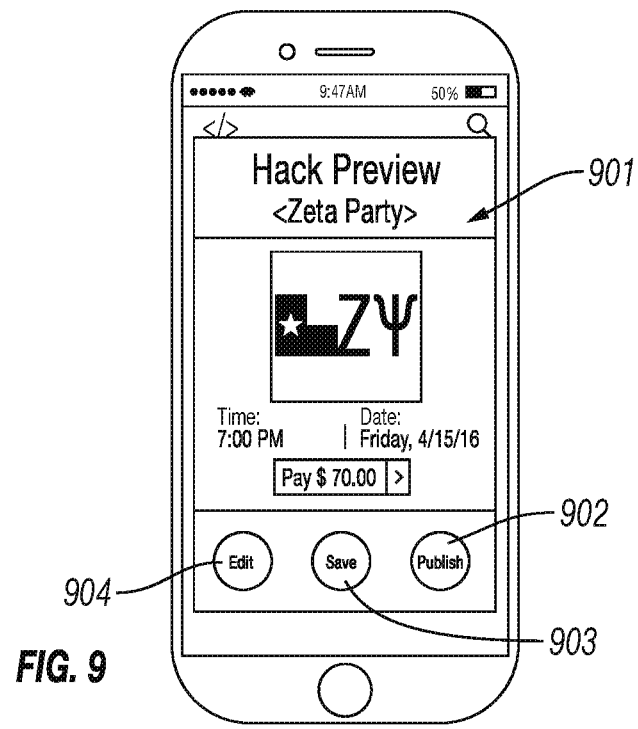

At step 301 of FIG. 3, the networked device environment 200 receives a user input indicative of the user's desire to create a bot. This may be facilitated by a user's selection of the "bot generator" button 410 illustrated in FIG. 4. At step 302, the bot server 220 generates a GUI that is displayed on the user device 230 prompting the user to build a bot from a template. In FIG. 5, the bot templates are listed in a menu option 501. At step 303, the bot server 220 receives the user selection of an "event" bot 502. At step 304, the bot server 220 retrieves the event template 601 from the template database 206 and generates a GUI that is displayed on the user device 230 to present the event template 601 to the user as shown in FIGS. 6 and 7. The event template 601 include data fields for the event name 602, event time 603, event date 604, event location 605, cost of admission 606, a description of the event 607, and an image associated with the event. As shown in FIG. 8, a user may select an image 801 from the user device 230 to complete the data field 701. Once this information is entered into the data fields by the user, the bot server 220 receives the user data to build the bot at step 305. As shown in FIG. 9, a preview of the bot 901 may be presented to the user. Once the user approves the bot by selecting the "publish" button 902, the bot is stored in the bot database 204 at step 306. In some embodiments, the user may save the bot by selecting the save button 903, or can edit the bot by selecting the edit button 904.

Figure 10:
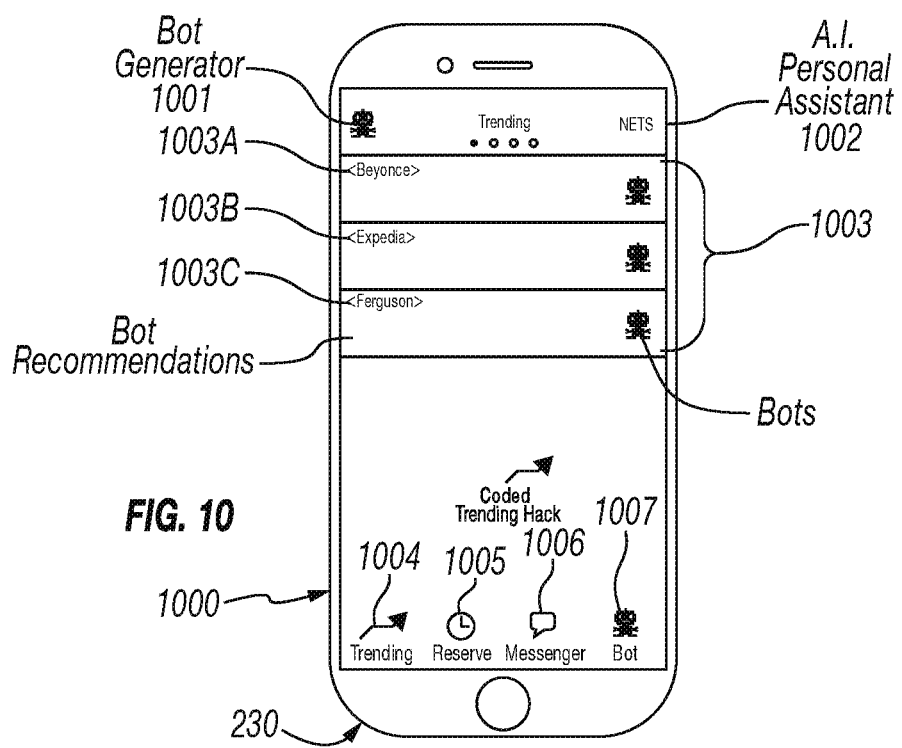
FIG. 10 illustrates a sample screenshot of an embodiment of a GUI presented on a user device and including elements adaptively arranged by an exemplary bot creation and sharing processor operating in a networked context environment.

Reference is now made to FIG. 10, which illustrates a sample screenshot of an embodiment of a GUI 1000 presented on a user device 230. As shown in FIG. 10, the GUI 1000 includes a button 1001 for generating a bot, a button 1002 for accessing the AIPA, and a listing 1003 of bots 1003A, 1003B, and 1003C. In the embodiment illustrated in FIG. 10, the bots listed are those that are trending among users. In other words, the trending bots are those that are currently the most popular bots being used by other users of the networked device environment 200. The trending bots are shown by selecting the trending button 1004. Similarly, the user's recently used bots may be displayed when the user selects the "Recent" button 1005. The messenger application may be accessed when the user selects the "Messenger" button 1006, and the user's profile is accessed when the user selects the "Me" button 1007. An example illustration of the messenger application is provided in FIG. 11, wherein a bot 1101 is provided in a message 1102 send using the messenger application.

Figure 12:
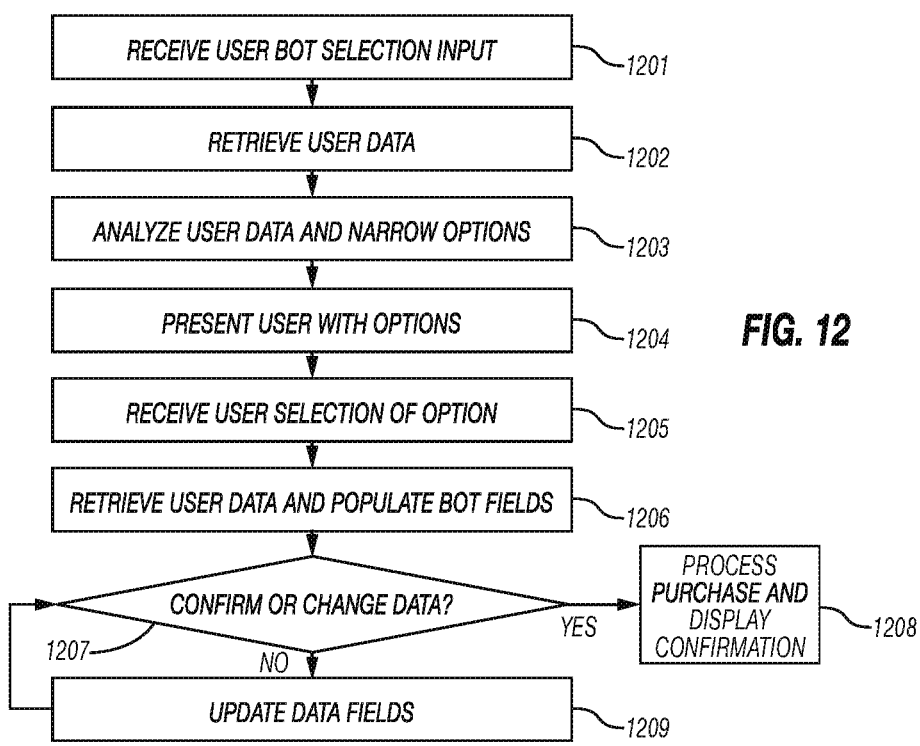
FIG. 12 illustrates an example flow chart of a method for processing a bot selection.

In some embodiments, when a user selects a bot (e.g., by selecting one of the bots displayed to the user), the bot server 220 processes the bot selection in accordance with the method illustrated in FIG. 12 and the screenshots provided in FIGS. 13-16. The method in FIG. 12 and the screenshots in FIGS. 13-16 correspond to an example of a user selecting a bot to purchase shoes.

Figure 13:
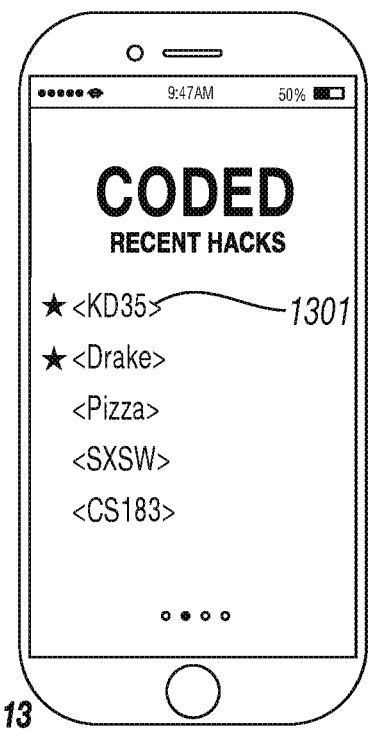
FIGS. 13-16 illustrate example screenshots corresponding to an example method for processing a bot selection.

At step 1201 of FIG. 12, the bot server 220 receives a user input indicative of bot selection. A user may select or access a bot by clicking on a bot presented in the messenger application (see FIG. 11) or browser (see FIG. 18), performing a search in the messenger or browser, receiving a bot from the AI Personal Assistant (in messenger or email form), or the completion of a triggering event (e.g., user wearing a smart backpack walks into a room, and Bluetooth connection established between a local network and the smart backpack, thereby serving as a triggering event). In FIG. 13, the user selects the "<KD35>" bot 1301, and the bot server 220 receives the user selection at step 1201 of FIG. 12. At step 1202, the networked device environment 200 then retrieves user data such as, for example, the user's location data, from the user data stored in the user database 202. This information is used to customize the selection of the product to be sold via the bot so that the product corresponds with the user's preferences as determined from analyzing the user data.

Figure 14:
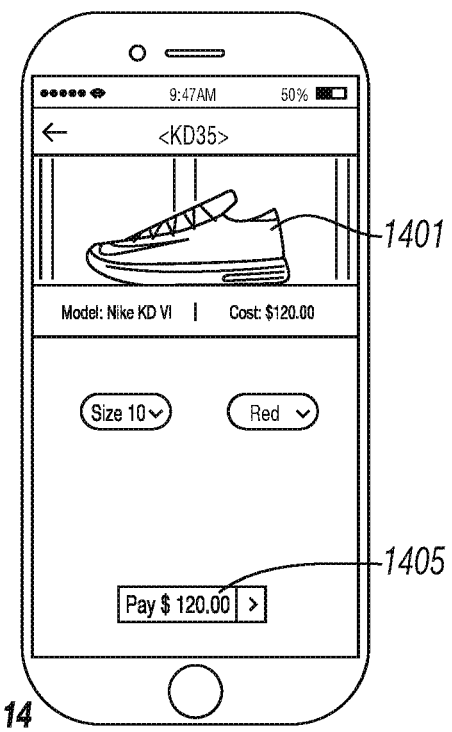

At step 1203, a server (e.g., server 210 or server 220) analyzes the user data (e.g., the user's "likes," user preferences, etc. from user activity and the user data in the database 202) to narrow down a selection of bot options that are likely to coincide with current context environment and/or the user's preferences by matching keywords from user data, matching other user data, matching business data, and/or using data from sensors to data, such as keywords, which describes or relates to the item to be sold via the selected bot. As step 1204, the narrowed option(s) is presented to the user as shown in FIG. 14. As shown in FIG. 14, a shoe 1401 is presented to the user having a size 10 and color of red. This may be determined by analyzing the user data to determine the user wears a size 10 shoe and prefers the color red (for example, from analyzing data pertaining to previous shoe purchases). Moreover, the shoe 1401 may have been designed by another user while following a user path, as discussed elsewhere herein.

Figure 15:
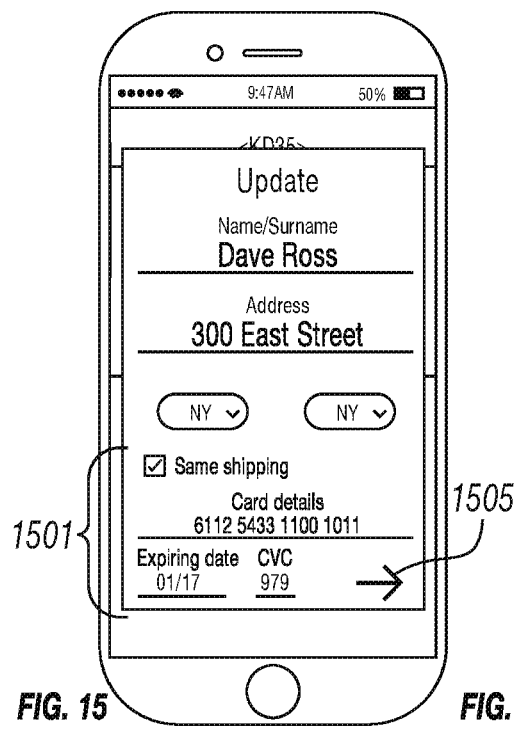
Figure 16:
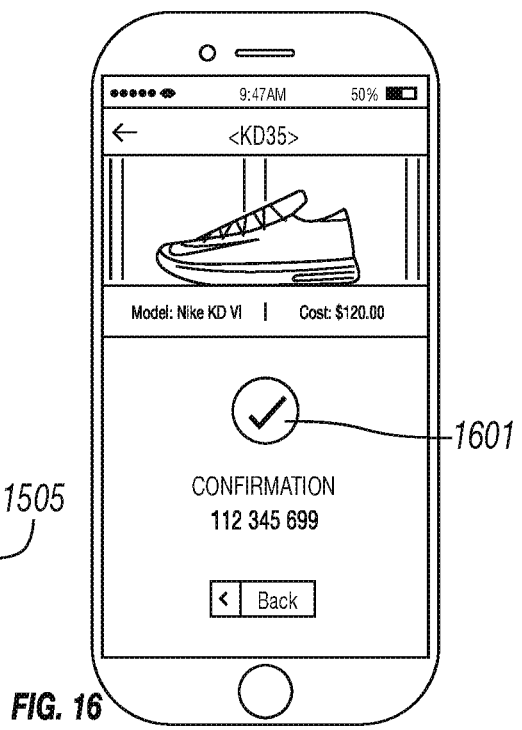

At step 1205, the user selects the shoe option by selecting the "Pay" button 1405, and the bot server 220 receives the user's selection of the option. At step 1206, the server 210 or 220 then retrieves user payment and shipping information from the user data, and populates payment and shipping fields 1501 for completing purchase as shown in FIG. 15. At step 1207, the networked device environment 200 presents the user with the option to correct or confirm payment and shipping data as shown in FIG. 15. If the user confirms the payment and shipping data by selecting the confirm button 1505 in FIG. 15, the networked device environment 200 processes the purchase with the vendor/user and displays purchase confirmation 1601 to the user at step 1208, and as shown in FIG. 16. If the user changes the payment or shipping data, then the server 220 updates the payment/shipping data at step 1209, and returns to step 1207.

In some embodiments, the bots may serve as a shortcut for accomplishing a particular task by accessing data stored in the system. For example, if a user wishes to order a pizza, the user traditionally searches for a pizza vendor, downloads a specific app for a particular pizza vendor, creates a user account for the vendor, specifies the pizza to be made, enters payment information, enters delivery information, then completes the order. With a bot, however, the user simply accesses a bot for ordering a pizza. The system then accesses the database to retrieve a listing of pizza vendors. Alternatively, the system may, in some embodiments, perform an Internet search for relevant interfaces for ordering pizza (for example, the computer may execute an Internet search for "pizza" then store the search results in memory as available pizza vendors). The system presents the listing of vendors to the user on a display. The system then receives a user input indicating selection of the user's preferred vendor. The selected vendor may, in some embodiments, be stored in memory and associated with the user data as a preferred pizza vendor of that particular user.

The system then accesses information from the vendor (either from an application programming interface (API) of the user/vendor or from the user/vendor's user data) to obtain options for ordering a pizza. These options are then presented to the user on the display so the user can select the pizza to be ordered. The user's selection is then received by the system, and the order is transmitted to the vendor. The system then accesses the user data to retrieve the user's location (as provided by, for example, the user's current GPS location, which is contained in the user data) to provide a delivery address, and to retrieve the payment data associated with the user (e.g., credit card information, billing address, etc.) to be used to complete the purchase of the pizza. This information is then provided by the system to the vendor to complete the pizza order.

In some embodiments, the user's actions with respect to accessing this particular bot, and any data that is generated from accessing the bot, is stored in a database (e.g., user database 202) and associated with the user data and associated with the user's recent activity. In some embodiments, the system may present the user's recent activity to the user so that the user can conveniently access the recently used bot in the future.

As demonstrated by the foregoing example, the system streamlines the ordering process for the user to reduce the input needed from the user for ordering a pizza, thereby reducing the computational labor overhead burdening the processors. Additionally, this process improves the system's ability to display information to and interact with the user by reducing the data gathering required to accomplish the task desired by the user. Specifically, regarding user input, the above example demonstrates a streamlined process whereby the user only enters data to select a vendor and a particular pizza. The disclosed system eliminates the user input related to the steps of searching for a pizza vendor, downloading a specific app for a particular pizza vendor, creating a user account for the vendor, entering payment information, and entering delivery information.

Various embodiments of the disclosed networked device environment 200 may include data to facilitate the user interface for creating and sharing bots. For example, the system may use metadata tags, which are names of the bots. The metadata tags can be displayed to a user based on their user data, current activity, trends, or based on other user data. The user data for a user may include business data such as APIs for vendors/members. The APIs may serve as bots that are stored in the bot database 204.

In some embodiments, the networked device environment 200 includes an open source portion, which serves as a platform for allowing the networked device environment 200 to communicate with members/vendors. Because some vendor APIs are generally public or available, the networked device environment 200 can retrieve these APIs without input from the vendor. Users/vendors can access the networked device environment 200 through the open source platform to develop/build bots.

In some embodiments, the system includes an artificial intelligence server 227. The artificial intelligence server 227 determines, in some embodiments, which bots are relevant to users based on user data, activities, trends, recent activity data, recently used bots, etc. The AI server 227 analyzes data in the entire networked device environment 200 to determine trending bots and other relevant bots.

In some embodiments, the AI server 227 is capable of serving as an interface between a user and the networked device environment 200. The AIPA server 227 may, in some embodiments, provide automated interaction with a user. For example, the AIPA server 227 is capable of requesting information from a user, assisting a user with searching for a particular bot, assisting a user with solving a problem or accomplishing a goal, making recommendations to a user, and using artificial intelligence to interact with a user in various other ways. For example, in some embodiments, a user can contact the AIPA server 227 by, for example, using the messenger application or sending an email to the AIPA. The AIPA is able to read and understand the content of the message/email, and can respond to the user in an effort to help the user with solving a problem or accomplishing a goal.

In some embodiments, the user data includes payment data, such as credit card data, banking information, shipping information, and any other information that is used to purchase goods or services.

In some embodiments, the networked device environment 200 may include a database for various forms for use by vendors/users to accomplish certain tasks. For example, if the user wants to schedule a dentist appointment, the dentist's office may require the user to complete forms. These forms may be stored in the forms database and then presented to users who want to use the dentist's office.

In some embodiments, the networked device environment 200 may include a subscription server that is used to manage the user accounts, charge membership fees for user access to the system, manage user subscription to the system, or other such tasks.

Figure 11:
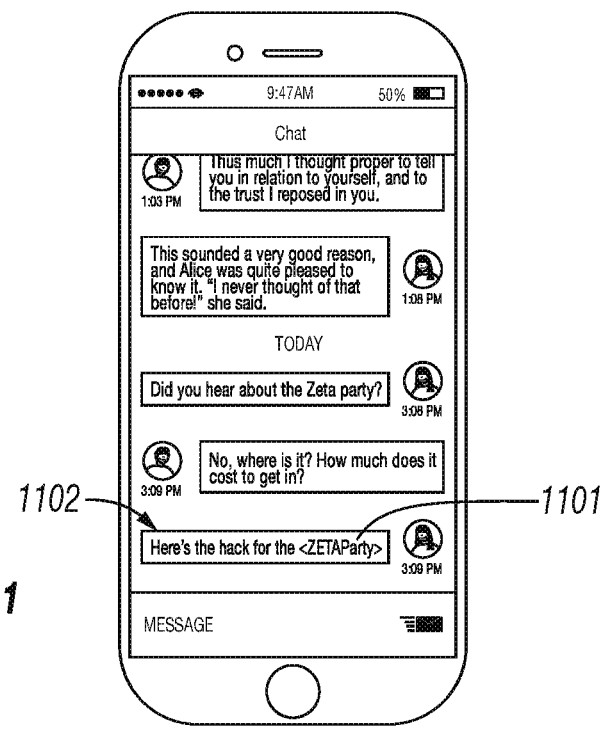
FIG. 11 illustrates an example screenshot of the messenger application.

In some embodiments, the networked device environment 200 includes a messenger server 225 for operating a messenger application. The messenger application provides a platform for users to communicate with each other via messages sent through the networked device environment 200 to other user devices 230. The messenger application also allows users to share bots through messages as shown in FIG. 11.

Bots are automated tasks or executable processes performed by the computer processors associated with the networked device environment 200. The bots streamline processes that, if performed by a user, would require additional, unnecessary computing labor and bandwidth consumption performed by the processors, as well as cause GUI items to be displayed in an overlapping and potentially unintelligible arrangement. Sending a bot via the messenger application is simpler than sending links, which are generally very long and inconvenient. Additionally, the bot is different than a hashtag because the bot executes an action (for example, purchasing an item), whereas a hashtag does not.

Figure 20:
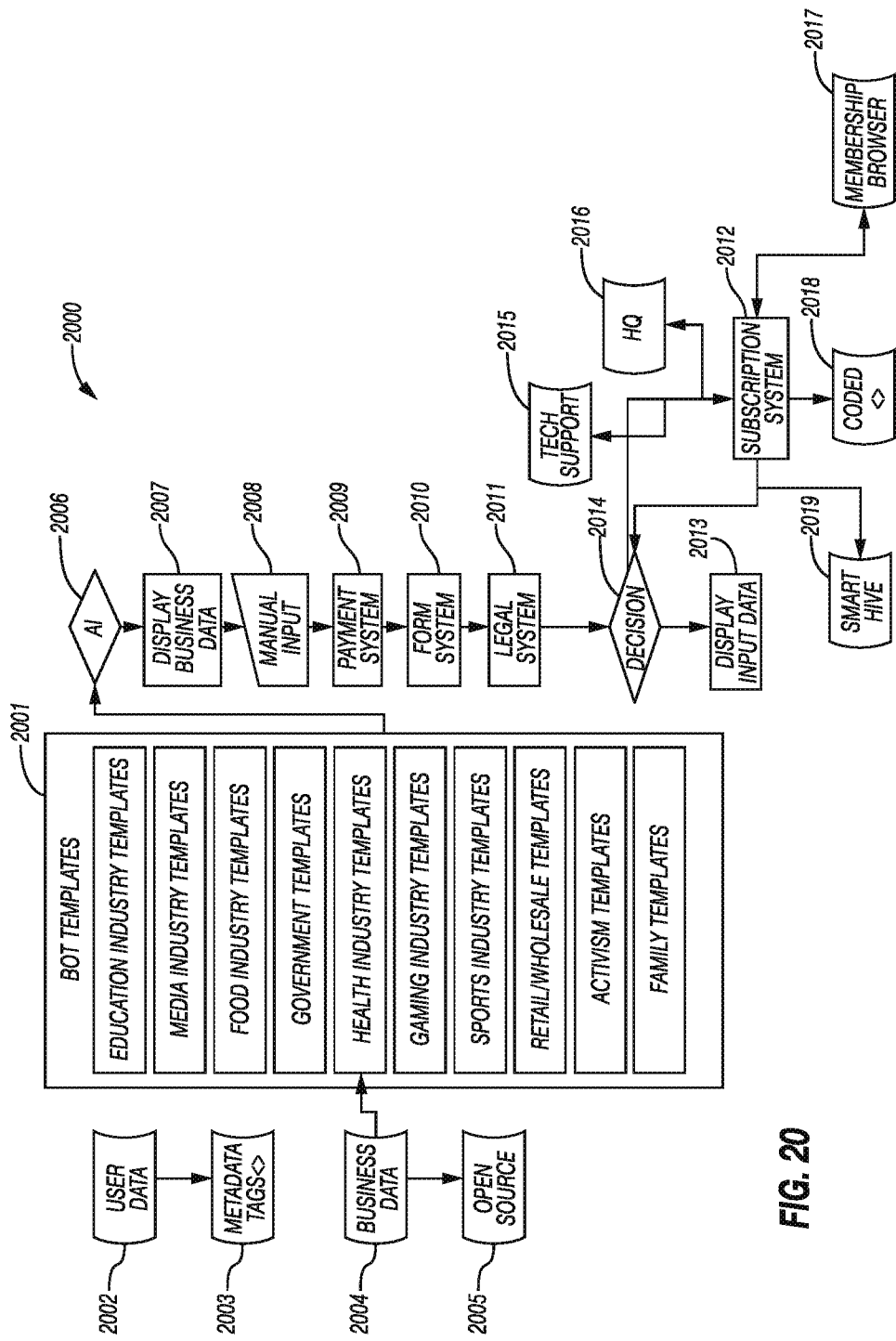
FIG. 20 depicts various aspects of structured data with specific emphasis on bots, in accordance with various embodiments.

With additional reference to FIG. 20, in some embodiments, a bot may be generated using the bot server 220 according to a bot handling method 2000. The bot server 220 includes a bot template database 206 that stores bot templates for use with specific categories or industries for bots. Examples of bot templates include, but are not limited to, the following: education industry templates, media industry templates, food industry templates, government templates, health industry templates, gaming industry templates, sports industry templates, retail/wholesale templates, activism templates, and family templates. In other words, bots may be created for virtually any industry or activity. In some embodiments, a processor associated with the bot server 220 or user server 210 may execute code to communicate with a user when creating a bot. For example, in some embodiments, the processor receives input from a user indicating the user's desire to create a bot (step 2002). In response, the processor prompts the user to build a bot using one of the templates, receives data from the user, such as in association with metadata tags (step 2003), receives external data from other sources both within the system and outside the system and both structured and unstructured (collectively, "business data") (step 2004), and creates the bot by applying a bot template (step 2001). The bot handling method 2000 may go on to provide open source outputs, such as providing data of step 2004 for open source release (step 2005) and further may apply artificial intelligence (step 2006) to structure the user data and the business data to improve processing time and reduce data traffic. The bot handling method 2000 may continue following the application of machine learning to displaying aspects of the business data according to the directives of an alignment translator 164 (step 2007) so that further manual user input may be accepted (step 2008). This manual input may be from a variety of system users. For instance a creator may be involved in steps 2002-2006, and a customer may be involved in steps 2008 and 2009 in order to purchase a product or service provided in associate with the bot. For instance, step 2009 may include interaction of the bot formed according to the bot template with a payment system (step 2009) to accept and/or process a payment. As well as a form database as mentioned (Step 2010) and legal services/document database (step 2010). Moreover, FIG. 20 also shows that a decision is made (step 2014) so that data is displayed in a user readable non-interfering way (step 2013).

Notably, FIG. 20 also shows various asynchronous aspects of the bot handling method 2000 which also participate in the decision made so that the data is displayed in a user readable non-interfering way. Thus, for discussion of asynchronous aspects, specific apparatus elements will be noted, rather than steps. These apparatus elements feed data to decision step 2014 and further influence the making of the decision of how to arrange the data in a user readable non interfering way. For instance, step 2014 may further include drawing data from a subscription system 2012 which allows user devices to access the method 2000 in accordance with terms of subscription service. A corporate headquarters 2016 and a tech support organization 2015 may further provide rules for the decision step 2014 and data to influence the decision step 2014. Furthermore, a smart hive 2019 may be a memory or other data store, or one of the repository/ database/memory aspects discussed with reference to other figures, or may be a logical combination thereof wherein data relevant to a user and/or user device and actions of the same may be stored. Moreover, the decision outcome of the decision step 2014 may be stored so that future similar decisions regarding the display of input data (step 2013) may proceed with reduced processing overhead, based on the loading of the historical display of input data at a previous point in time. A "CODED < >" code repository 2018 wherein bots and/or data regarding bots may further provide various bots for display and decision step 2014 may determine a user readable non-interfering arrangement thereof, or may determine to exclude some or all bots from display. Finally, a membership browser 2017 may interact with the subscription system 2012 to permit users to add, remove, update, or otherwise manage their relationship with the subscription system 2012 and specifically, the rights of their user device(s) to participate in method 2000 as a display device for the display of input data at step 2013.

In some embodiments, the networked device environment 200 may include a browser application that is capable of providing an Internet browser that is integrated with the networked device environment 200. In some embodiments, the user may login to the browser to gain unrestricted access to websites for which the user database 202 contains the user's login information. For example, the user database 202 may store a user's bank account information, including login information. When the user visits their bank webpage, the browser pulls the bank account login information and completes the login process for the user automatically. In this way, websites that a user visits using the browser are automatically accessible without the user having to login to those websites.

Figure 17:
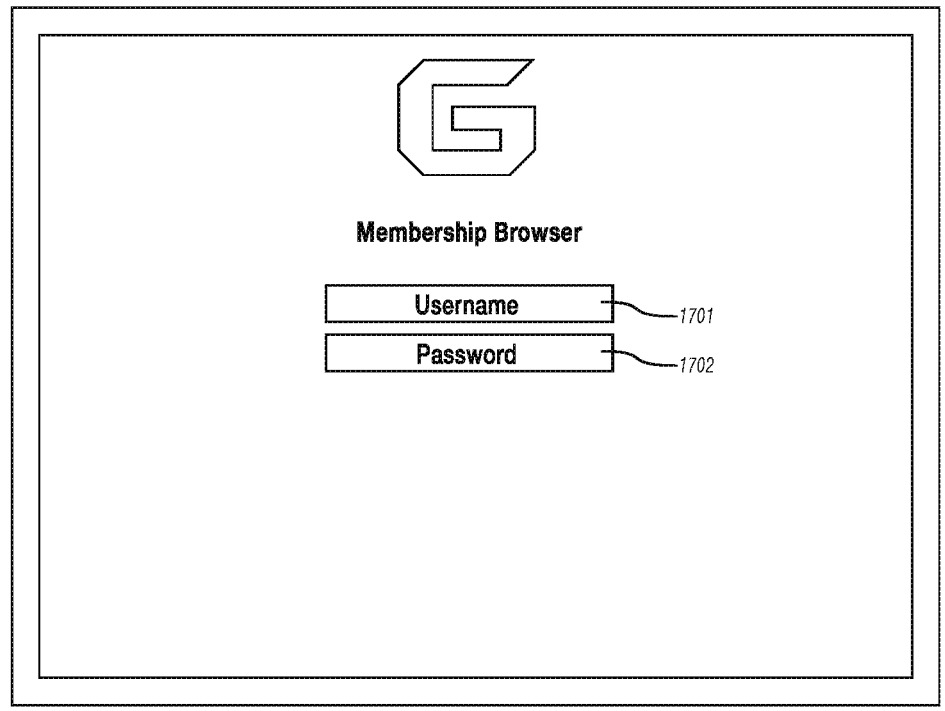
FIGS. 17 and 18 illustrate example embodiments of browser GUIs displaying elements representing bots adaptively arranged by an exemplary bot creation and sharing processor operating in a networked context environment
Figure 18:
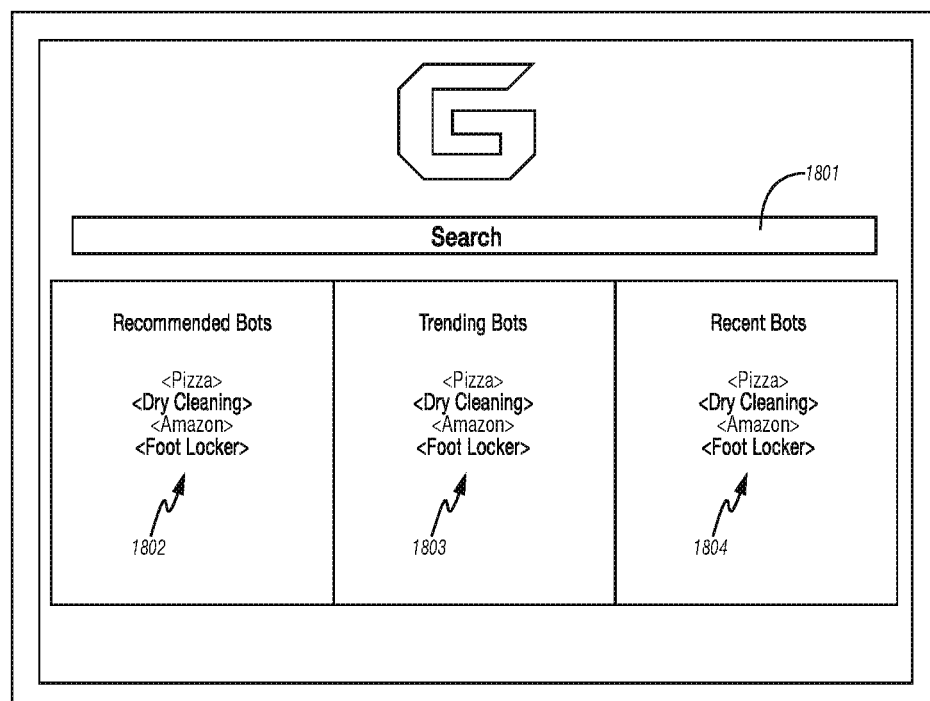

Example browser GUIs are illustrated in FIGS. 17 and 18. As shown in FIG. 17, the browser includes a user login screen where the user enters their username in the username data field 1701 and their password in the password data field 1702. The browser GUI in FIG. 18 includes a search field 1801, a listing of recommended bots 1802, trending bots 1803, and recently used bots 1804. Single login functionality disclosed herein reduces computational labor overhead by automating tasks and consolidating data used to complete such tasks.

Figure 21A:
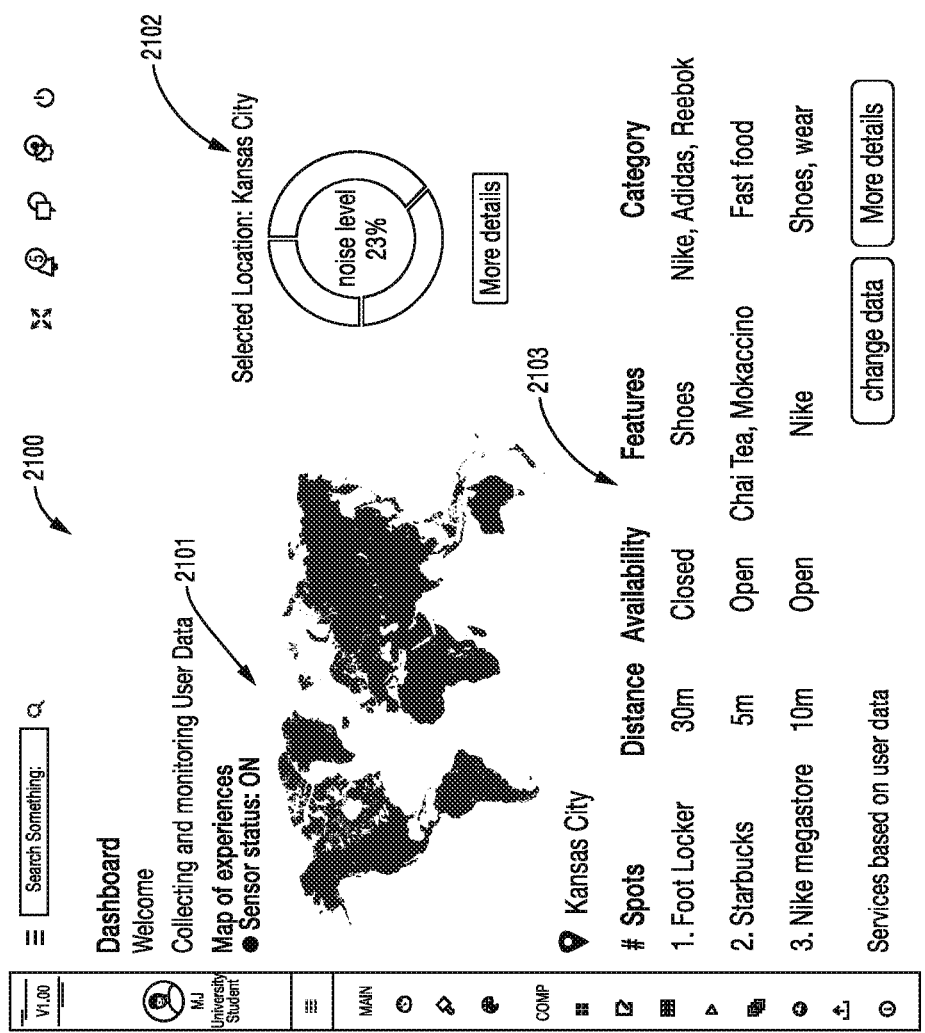
FIGS. 21A-C depict further aspects of a sample screenshot of an embodiment of a GUI presented on a user device and including elements adaptively arranged by an exemplary bot creation and sharing processor operating in a networked context environment.
Figure 21B:
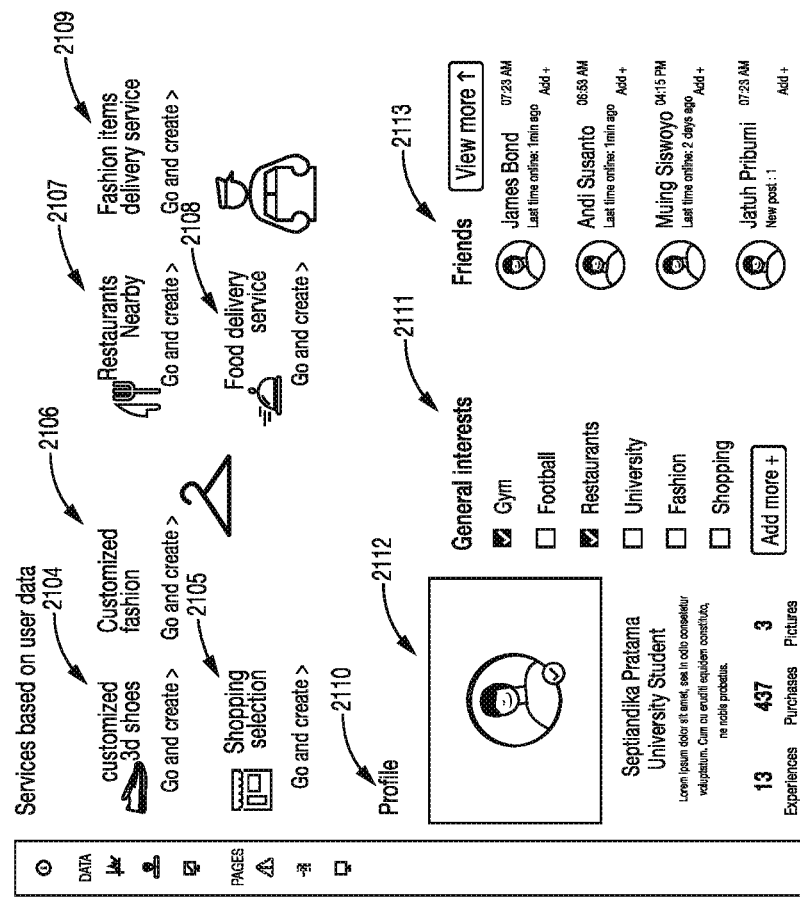
Figure 21C:
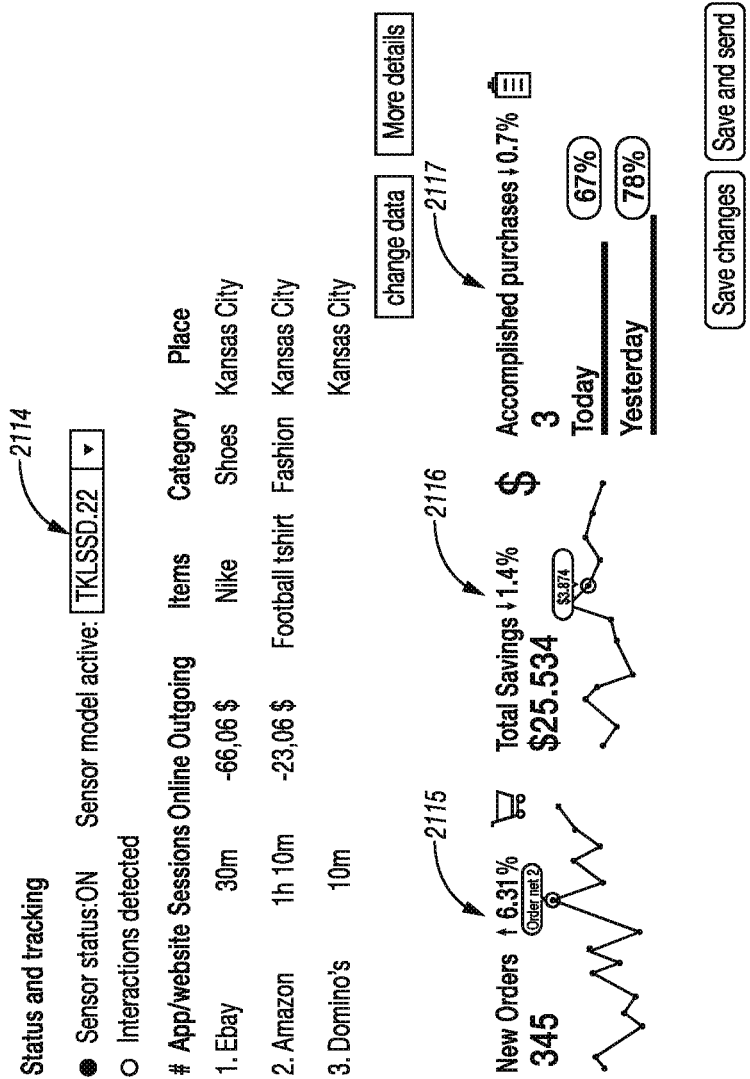

Further example browser GUIs are illustrated in FIGS. 21A-C. A browser may include a user dashboard 2100 wherein a user may interact with bots and manage data in the system. The user may, for example, be running bots to facilitate education and entrepreneurship in the shoe industry, thus the user dashboard 2100 may be adaptively arranged and configured to depict elements relevant to the shoe industry in a non-interfering arrangement. For instance, a log of stores visited by a user 2103 may be in various instances provided, but in a location proximate to other indicia of collected data such as location data 2101 and sensor data 2102 that is located so as to not overlap services 2104-2109 based on the user data. The user dashboard 2100 may display services that may be provided by bots to the user based on the user data. For example, the user interested in shoe industry entrepreneurship may be provided a link to customize shoes for sale to other users on the system 2104, or to create customized fashion items 2106, or the user may be presented bots that allows the user to provide services to other user's bots, for instance, to work as a fashion item delivery service 2109, a food delivery service 2108, or to perform various life tasks such as shopping 2105 and visiting restaurants 2107. Thus a plethora of bots are presented based on user data and allowing the user to operate both as a creator 187 (FIG. 1C) and as a supplier 184 (FIG. 1C).

Within the user dashboard 2100, collected user data may include location data 2101 and sensor data 2102 such as noise levels. The user may control the sensor, such as by setting which sensor(s) are active at a sensor control interface 2114. The user dashboard 2100 may allow the user to manage the data within a user profile 2110, for instance, a profile picture 2112, user interests 2111, and user friends 2113.

The user dashboard 2100 may display statistics regarding the performance of a user's bots. For interest, a user running a bot to create customized fashion items 2106 may be shown statistics relevant to that bot. In this manner, the elements shown on the screen are adaptively selected, arranged, and displayed in a user readable non-interfering manner depending on which bots are active. For instance, a new order graph 2115 may be displayed showing historical trends related to order frequency, a total savings graph 2116 may be displayed showing the user's accumulation of financial savings over time, and accomplished purchases charts 2117 may show quantities and trends of purchases over time.

Figure 19A:
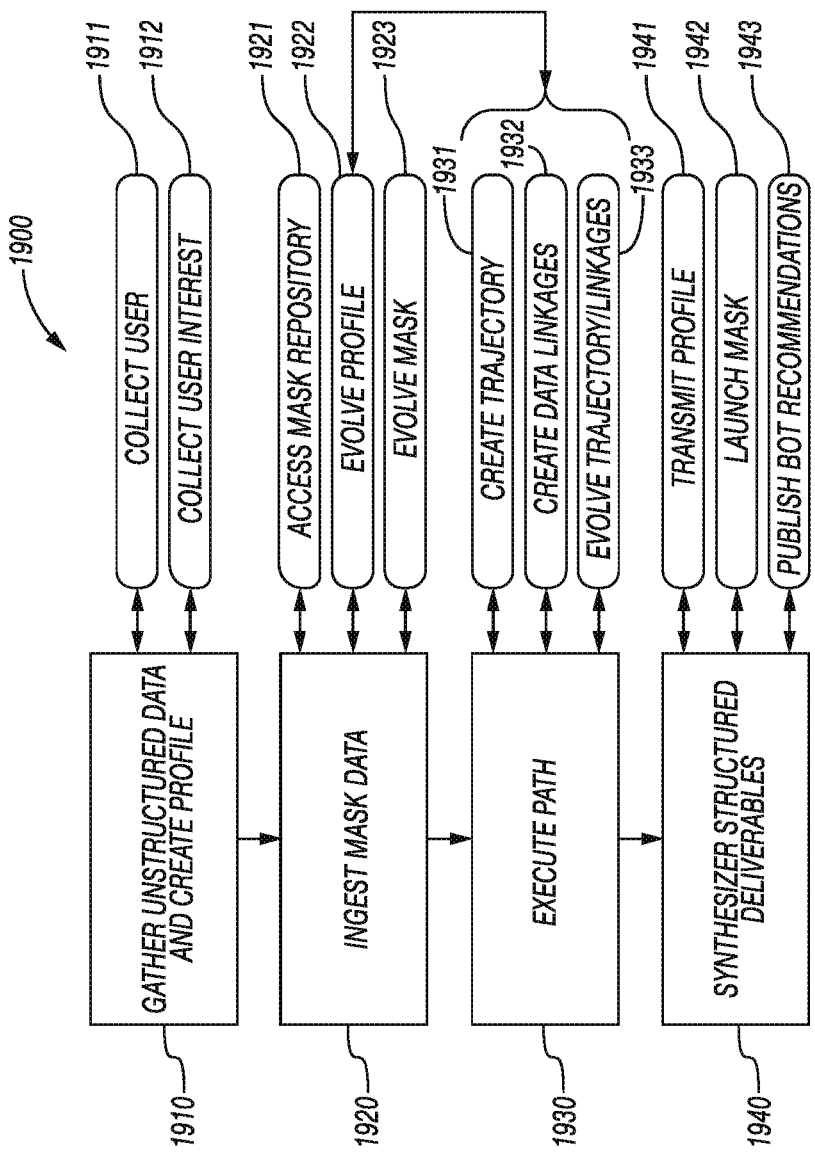
FIG. 19A depicts an example flow chart of a method of processing unstructured data to synthesize structured deliverables.
Figure 19B:
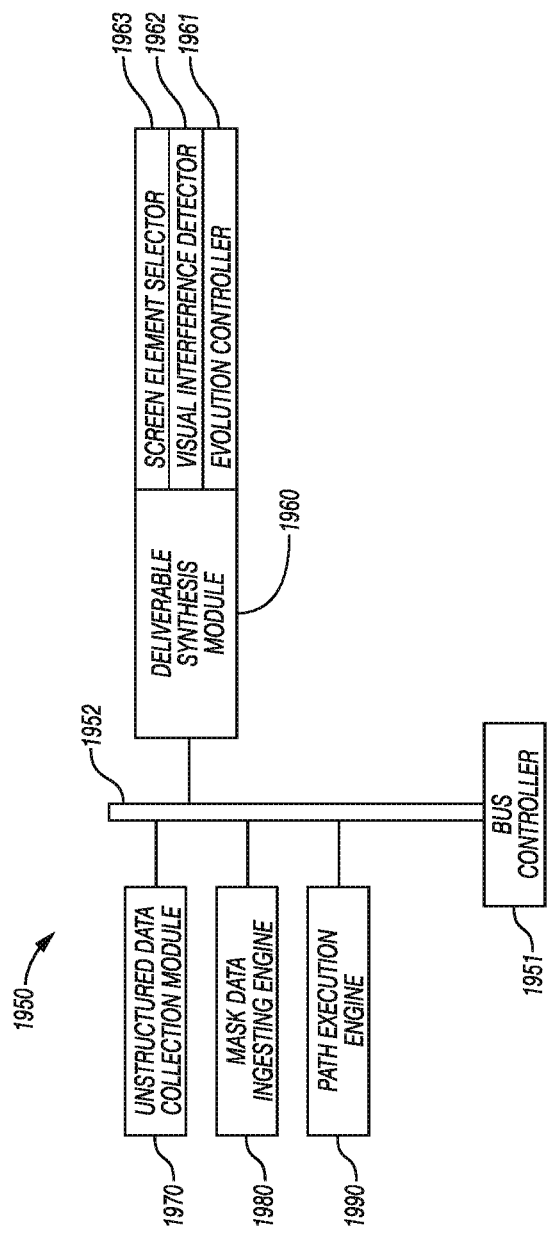
FIG. 19B depicts an exemplary structured deliverable synthesis subsystem of the bot creation and sharing processor of the special-purpose computer according to FIG. 1A, in accordance with various embodiments.

The systems and methods discussed herein may be implemented to, with the aid of bots, synthesize structured deliverable data from unstructured data. For instance, with reference to FIG. 19A-B, a method of structuring data 1900 by a data structuring sub-unit 1950 of a processor 114 is disclosed. Notably, the data structuring subunit 1950 may comprise a logical data bus 1952 to allow communication among modules under control of a bus controller 1951. Moreover, as a logical unit of processor 114, the data structuring sub-unit 1950 may further communication with modules on bus 151 under control of bus controller 150 (See FIG. 1B).

The method 1900 may comprise gathering unstructured data and creating a profile (Step 1910). Aspects of the processor 114 discussed in FIG. 1B may be logically arranged to interoperate with those according to FIG. 19B. For instance, an I/O module 152 of a processor 113 may receive unstructured data from any source discussed herein, such as third-party repositories, sensors, etc., and also receive structured user data from a platform user database 158 via a network 161 and these may be communicated to aspects of FIG. 19B, such as a unstructured data collection module 1970.

Such a step may include substeps, for instance, collecting a user (step 1911) then collecting an interest from that user corresponding to unstructured data, a user selection and/or corresponding to a random assignment (step 1912), for instance, the shoe industry, or party planning, or the like.

The method may continue with ingesting mask data (step 1920). For instance, mask data may comprise a filter configured to select or deselect discrete elements of unstructured data in order to assign a subset of discrete elements a sequence to a user to create an assigned "user path" which comprises a workflow involving tasks to educate the user about the interest and facilitate the user's engagement in commercial transactions as a creator 187 (FIG. 1C) and/or as supplier 184 (FIG. 1C) within that interest. Again, aspects of the processor 114 discussed in FIG. 1B may be logically arranged to interoperate with those according to FIG. 19B. For instance, a user path mask engine 165 may establish a user path by masking path elements drawn from a user path repository 159 according to user data and business data within a user profile, third-party data sources, and from a sensor overseer 153 and an I/O module 152 and communicate them to a mask data ingesting engine 1980 comprising a mask repository submodule 1981 (which may share data with the user path repository 159, or may be another logical descriptor of the same data store). A path element may be an option to create a bot, an option to use a bot, an instruction to engage in a transaction, an instruction to engage in a meeting, such as a meetup or hackathon, an instruction to go to a location, and/or any other aspect that potentially may form a portion of a user path. Such a step may include substeps, for instance, accessing a mask repository to retrieve path elements drawn from a user path repository 159 (step 1921), evolving a user profile to update the user path by masking path elements drawn from the user path repository 159 (step 1922), and further evolving the mask applied for the user so that the user path can also evolve as the user profile evolves due to interactions of the user with the system and other users as well as unstructured and structured data, such as provided by the sensor overseer 153 monitoring a sensor (step 1923).

The method may continue with executing a user path (step 1930) by a path execution engine 1990. For instance, unstructured data (and structured data) may be implemented, or alternatively a random assignment may be made to create for the user a user path (also called a "trajectory") (step 1931). For instance, a user may be shown bots related to a specific industry and work or educational opportunities in that industry. The user may be provided notifications via a notification generator 155 revealing elements of the user path via a graphical user interface. For instance, the notifications may include instructing that user to engage in events such as "meetup" events to learn and "hackathon" events to test the user's skills. The user may follow the user path, or may deviate from it. The system may alter the user path based on the deviations or based on the user following the user path. More specifically, data linkages may be created (step 1932) associating unstructured data with the user path to characterize the user's behavior in following the path or deviating from it. Notably, this step may further lead to further evolving of the user profile in response to changes in the data linkages (adding, deleting, etc.) (Step 1922). Moreover, the user path as well as the data linkages maybe evolved as the user interacts with the system along the user path or deviates from the user path (step 1933). These aspects may be shared from bus 1952 to bus 151 for use by modules of FIG. 1B. By creating data linkages associating specific data with specific aspects of a user path, the network is improved because data retransmission is reduced and further the GUI is improved because data not having proper linkages may be removed from or prevented from being displayed. For example, data indicating that a user attended a meetup, such as location data from a sensor that is provided by a sensor overseer 153 (FIG. 1B) may be linked to an aspect of the user path instructing a user to attend a meetup and gain domain specific knowledge and skills before being allowed to create a bot in a certain domain, for instance, shoe design. The association of the linkage to the aspect of the user path captures the authorization of the user to proceed to create a bot in that domain, without needing the retransmission of sensor data, thereby improving network operation by reducing traffic. Furthermore, the GUI may actively recreate at direction of an I/O module 152 (FIG. 1B) operating under the influence of an evolution controller 168 (FIG. 1B) so that an alignment translator 164 (FIG. 1B) populates the bot creation controls onto the users screen following the successful data linkage, and effectuates the population in such a manner as to avoid interference with other displayed information.

The method may further continue with converting the myriad unstructured data as well as the evolutionary profile, mask, linkages, and user path into a synthesized structured deliverable (step 1940) by a deliverable synthesis module 1960. In various embodiments, the deliverable comprises a display of data that is tailored to the user and displayed on a GUI in a non-interfering arrangement. Thus, as with the other modules discussed, one may appreciate that the deliverable synthesis module 1960 may be considered a logical grouping of aspects presented in FIG. 1B, and/or may comprise an additional module configured to interoperate with the logical grouping of aspects presented in FIG. 1B.

For instance, the user profile may be transmitted from a platform user database 158 to bus 1952 for availability to other aspects of the system. Notably, step 1940 of creating a synthesized structured deliverable may include sub steps. For instance, the user profile may be transmitted to the bus 1952 (step 1941) and received by a mask data ingesting engine 1980, a mask may be launched to reconcile the content of the user profile (step 1942) with a user path to evaluate how closely the user is following the path or deviating from the user path by the path execution engine 1990, and in response, recommendations may be published to the GUI display recommending one or more bot to the user for the user to interact with (step 1943) by the deliverable synthesis module 1960. In this manner, the GUI display is further enhanced by limiting the publication of bots to only that subset potentially relevant to the user and not displaying the entire library of bots.

The delivery synthesis module may comprise aspects to more effectively effectuate step 1943. For instance, the delivery synthesis module may comprise a screen element selector 1963 configured to select which aspects of the structured data (a first subset of the structured data) to display and which aspects of the structured data (a second subset of the structured data) for non-display due to network congestion, graphical user interface size limitations, and an arrangement of extant elements on the graphical user interface, and/or the like thus improving network performance and adaptably creating the GUI arrangement as needed. The delivery synthesis module may also comprise a visual interference detector 1962 configured to detect actual or potential interference among one or more element arranged on the GUI (for instance, aspects of FIG. 20) and direct the screen element selector 1963 to select or deselect elements to ameliorate interference, or to move elements around the screen to ameliorate interference. Finally, the deliverable synthesis module 1960 includes an evolution controller 1961 (for example, an evolution controller 168 depicted in FIG. 1B) configured to ingest user interaction with GUI elements and flow back amendments to the user profile and/or user path.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A bot system comprising:
   at least one processing circuit having at least one processor communicably coupled to at least one memory, the at least one processing circuit configured to:
   provide a bot at least partially in response to completing a triggering event;
   receive, from a user device, an input indicative of a selection of the bot;
   access user data comprising at least GPS location data and user preferences associated with a user of the user device;
   identify a selection of bot options based on analyzing the user data, wherein the selection of bot options is associated with at least two third-parties, wherein the parties of the at least two third-parties sells a good or service, and wherein the identified selection of bot options comprises at least one good or service from the parties of the at least two parties;
   present, via the user device, the selection of bot options, wherein the selection of bot options comprises selectable elements and content specific to the user and a particular third-party of the at least two third-parties based on the user data comprising the GPS location data and the user preferences;
   receive, from the user device, a selection of an option from the selection of bot options;
   access user payment information and shipping information based on the user data and populate one or more fields associated with the selection of the option; and
   present, via the user device, a confirmation page to confirm the populated one or more fields.

2. The bot system of claim 1, wherein the input indicative of the selection is via an application installed on the user device or a browser accessed on the user device.

3. The bot system of claim 2, wherein the input comprises at least one of a selection or access of the bot presented via the application, a search performed via the application, a competition of a triggering event, or an artificial intelligence personal assistant.

4. The bot system of claim 1, wherein identifying the selection of bot options further comprises:
   access, via an application programming interface (API), information of one or more vendors providing the selection of bot options associated with the bot.

5. The bot system of claim 1, wherein the user data comprises at least one of user likes or user activity.

6. The bot system of claim 5, wherein the selection comprises metadata tags presented via the user device based on the user data.

7. The bot system of claim 1, wherein the selection is associated with a plurality of items sold via the bot, and wherein the selection of the bot options comprises matching keywords of the user data with keywords of the plurality of items sold via the bot.

8. The bot system of claim 1, wherein the selection of the option comprises a selection to pay, and wherein the one or more fields comprises at least a payment field and a shipping field.

9. The bot system of claim 1, the at least one processing circuit further configured to:
   process a purchase of the selection of the option.

10. The bot system of claim 9, the at least one processing circuit further configured to:
   in response to processing the purchase, present, via the user device, a purchase confirmation.

11. A method comprising:
    providing, by at least one processing circuit, a bot at least partially in response to completing a triggering event;
    receiving, by the at least one processing circuit from a user device, an input indicative of a selection of the bot;
    accessing, by the at least one processing circuit, user data comprising at least GPS location data and user preferences associated with a user of the user device;
    identifying, by the at least one processing circuit, a selection of bot options based on analyzing the user data, wherein the selection of bot options is associated with at least two third-parties, wherein the parties of the at least two third-parties sells a good or service, and wherein the identified selection of bot options comprises at least one good or service from the parties of the at least two parties;

presenting, by the at least one processing circuit via the user device, the selection of bot options, wherein the selection of bot options comprises selectable elements and content specific to the user and a particular third-party of the at least two third-parties based on the user data comprising the GPS location data and the user preferences;

receiving, by the at least one processing circuit from the user device, a selection of an option from the selection of bot options;

accessing, by the at least one processing circuit, user payment information and shipping information based on the user data and populate one or more fields associated with the selection of the option; and presenting, by the at least one processing circuit via the user device, a confirmation page to confirm the populated one or more fields.

12. The method of claim 11, wherein the input indicative of the selection is via an application installed on the user device or a browser accessed on the user device.

13. The method of claim 12, wherein the input comprises at least one of a selection or access of the bot presented via the application, a search performed via the application, a competition of a triggering event, or an artificial intelligence personal assistant.

14. The method of claim 11, wherein identifying the selection of bot options further comprises:

accessing, by the at least one processing circuit via an application programming interface (API), information of one or more vendors providing the selection of bot options associated with the bot.

15. The method of claim 11, wherein the user data comprises at least one of user likes or user activity.

16. The method of claim 15, wherein the selection comprises metadata tags presented via the user device based on the user data.

17. The method of claim 11, wherein the selection is associated with a plurality of items sold via the bot, and wherein the selection of the bot options comprises matching keywords of the user data with keywords of the plurality of items sold via the bot.

18. The method of claim 11, wherein the selection of the option comprises a selection to pay, and wherein the one or more fields comprises at least a payment field and a shipping field.

19. The method of claim 11, further comprising:

process a purchase of the selection of the option; and in response to processing the purchase, present, via the user device, a purchase confirmation.

20. One or more non-transitory computer-readable storage media having instructions stored thereon that, when executed by a plurality of processing circuits, cause the plurality of processing circuits to:

provide a bot at least partially in response to completing a triggering event;

receive, from a user device, an input indicative of a selection of the bot;

access user data comprising at least GPS location data and user preferences associated with a user of the user device;

identify a selection of bot options based on analyzing the user data, wherein the selection of bot options is associated with at least two third-parties, wherein the parties of the at least two third-parties sells a good or service, and wherein the identified selection of bot options comprises at least one good or service from the parties of the at least two parties;

present, via the user device, the selection of bot options, wherein the selection of bot options comprises selectable elements and content specific to the user and a particular third-party of the at least two third-parties based on the user data comprising the GPS location data and the user preferences;

receive, from the user device, a selection of an option from the selection of bot options;

access user payment information and shipping information based on the user data and populate one or more fields associated with the selection of the option; and present, via the user device, a confirmation page to confirm the populated one or more fields.

* * * * *